(12) United States Patent
Robinson et al.

(10) Patent No.: US 8,647,402 B2
(45) Date of Patent: Feb. 11, 2014

(54) PROCESSES FOR GASIFICATION OF A CARBONACEOUS FEEDSTOCK

(75) Inventors: Earl T. Robinson, Lakeland, FL (US); Francis S. Lau, Darien, IL (US); Pattabhi K. Raman, Long Grove, IL (US); Vincent G. Reiling, Wheaton, IL (US); Dwain Dodson, Valparaiso, IN (US); Mustafiz Rahman, Watertown, MA (US); Nicholas Charles Nahas, Chatham, NJ (US)

(73) Assignee: Greatpoint Energy, Inc., Cambridge, MA (US)

( * ) Notice: Subject to any disclaimer, the term of this patent is extended or adjusted under 35 U.S.C. 154(b) by 1176 days.

(21) Appl. No.: 12/562,922

(22) Filed: Sep. 18, 2009

(65) Prior Publication Data

US 2010/0071262 A1    Mar. 25, 2010

Related U.S. Application Data

(60) Provisional application No. 61/098,475, filed on Sep. 19, 2008.

(51) Int. Cl.
*B23K 35/38* (2006.01)

(52) U.S. Cl.
USPC .................................................. 48/197 FM

(58) Field of Classification Search
None
See application file for complete search history.

(56) References Cited

U.S. PATENT DOCUMENTS 2,694,623 A   11/1954   Welty, Jr. et al.
2,791,549 A   5/1957    Jahnig
2,813,126 A   11/1957   Tierney
(Continued)

FOREIGN PATENT DOCUMENTS

CA   966660    4/1975
CA   1003217   1/1977
(Continued)

OTHER PUBLICATIONS

A.G. Collot et al., "Co-pyrolysis and co-gasification of coal and biomass in bench-scale fixed-bed and fluidized bed reactors", (1999) Fuel 78, pp. 667-679.

(Continued)

*Primary Examiner* — Imran Akram
(74) *Attorney, Agent, or Firm* — McDonnell Boehnen Hulbert & Berghoff LLP

(57) ABSTRACT

The present invention relates to processes and continuous processes for preparing gaseous products, and in particular, methane via the catalytic gasification of carbonaceous feedstocks in the presence of steam. In one aspect of the invention, the processes comprise at least partially combusting a first carbonaceous feedstock with an oxygen-rich gas stream in an oxygen-blown gasifier, under suitable temperature and pressure, to generate a first gas stream comprising hydrogen, carbon monoxide and superheated steam; and reacting a second carbonaceous feedstock and the first gas stream in a catalytic gasifier in the presence of a gasification catalyst under suitable temperature and pressure to form a second gas stream comprising a plurality of gaseous products comprising methane, carbon dioxide, hydrogen, carbon monoxide and hydrogen sulfide. The processes can comprise using at least one catalytic methanator to convert carbon monoxide and hydrogen in the gaseous products to methane and in certain embodiments do not recycle carbon monoxide or hydrogen to the gasifier.

15 Claims, 4 Drawing Sheets

(56) References Cited

U.S. PATENT DOCUMENTS

| | | | |
|---|---|---|---|
| 2,860,959 A | 11/1958 | Pettyjohn et al. | |
| 2,886,405 A | 5/1959 | Benson et al. | |
| 3,034,848 A | 5/1962 | King | |
| 3,114,930 A | 12/1963 | Oldham et al. | |
| 3,164,330 A | 1/1965 | Neidl | |
| 3,351,563 A | 11/1967 | Negra et al. | |
| 3,435,590 A | 4/1969 | Smith | |
| 3,531,917 A | 10/1970 | Grunewald et al. | |
| 3,544,291 A | 12/1970 | Schlinger et al. | |
| 3,594,985 A | 7/1971 | Ameen et al. | |
| 3,615,300 A | 10/1971 | Holm et al. | |
| 3,689,240 A | 9/1972 | Aldridge et al. | |
| 3,740,193 A | 6/1973 | Aldridge et al. | |
| 3,746,522 A | 7/1973 | Donath | |
| 3,759,036 A | 9/1973 | White | |
| 3,779,725 A | 12/1973 | Hegarty et al. | |
| 3,814,725 A | 6/1974 | Zimmerman et al. | |
| 3,817,725 A | 6/1974 | Sieg et al. | |
| 3,828,474 A | 8/1974 | Quartulli | |
| 3,833,327 A | 9/1974 | Pitzer et al. | |
| 3,840,354 A * | 10/1974 | Donath | 48/202 |
| 3,847,567 A | 11/1974 | Kalina et al. | |
| 3,876,393 A | 4/1975 | Kasai et al. | |
| 3,904,386 A | 9/1975 | Graboski et al. | |
| 3,915,670 A | 10/1975 | Lacey et al. | |
| 3,920,229 A | 11/1975 | Piggott | |
| 3,929,431 A | 12/1975 | Koh et al. | |
| 3,958,957 A | 5/1976 | Koh et al. | |
| 3,966,875 A | 6/1976 | Bratzler et al. | |
| 3,969,089 A | 7/1976 | Moss et al. | |
| 3,971,639 A | 7/1976 | Matthews | |
| 3,972,693 A | 8/1976 | Wiesner et al. | |
| 3,975,168 A | 8/1976 | Gorbaty | |
| 3,985,519 A | 10/1976 | Kalina et al. | |
| 3,989,811 A | 11/1976 | Hill | |
| 3,996,014 A | 12/1976 | Muller et al. | |
| 3,998,607 A | 12/1976 | Wesswlhoft et al. | |
| 3,999,607 A | 12/1976 | Pennington et al. | |
| 4,005,996 A | 2/1977 | Hausberger et al. | |
| 4,011,066 A | 3/1977 | Bratzler et al. | |
| 4,017,272 A | 4/1977 | Anwer et al. | |
| 4,021,370 A | 5/1977 | Harris et al. | |
| 4,025,423 A | 5/1977 | Stonner et al. | |
| 4,044,098 A | 8/1977 | Miller et al. | |
| 4,046,523 A | 9/1977 | Kalina et al. | |
| 4,052,176 A | 10/1977 | Child et al. | |
| 4,053,554 A | 10/1977 | Reed et al. | |
| 4,057,512 A | 11/1977 | Vadovic et al. | |
| 4,069,304 A | 1/1978 | Starkovich et al. | |
| 4,077,778 A | 3/1978 | Nahas et al. | |
| 4,091,073 A | 5/1978 | Winkler | |
| 4,092,125 A | 5/1978 | Stambaugh et al. | |
| 4,094,650 A | 6/1978 | Koh et al. | |
| 4,100,256 A | 7/1978 | Bozzelli et al. | |
| 4,101,449 A | 7/1978 | Noda et al. | |
| 4,104,201 A | 8/1978 | Banks et al. | |
| 4,113,615 A | 9/1978 | Gorbaty | |
| 4,116,996 A | 9/1978 | Huang | |
| 4,118,204 A | 10/1978 | Eakman et al. | |
| 4,152,119 A | 5/1979 | Schulz | |
| 4,157,246 A | 6/1979 | Eakman et al. | |
| 4,159,195 A | 6/1979 | Clavenna | |
| 4,162,902 A | 7/1979 | Wiesner et al. | |
| 4,173,465 A | 11/1979 | Meissner et al. | |
| 4,189,307 A | 2/1980 | Marion | |
| 4,193,771 A | 3/1980 | Sharp et al. | |
| 4,193,772 A | 3/1980 | Sharp | |
| 4,200,439 A | 4/1980 | Lang | |
| 4,204,843 A | 5/1980 | Neavel | |
| 4,211,538 A | 7/1980 | Eakman et al. | |
| 4,211,669 A | 7/1980 | Eakman et al. | |
| 4,219,338 A | 8/1980 | Wolfs et al. | |
| 4,225,457 A | 9/1980 | Schulz | |
| 4,235,044 A | 11/1980 | Cheung | |
| 4,243,639 A | 1/1981 | Haas et al. | |
| 4,249,471 A | 2/1981 | Gunnerman | |
| 4,252,771 A | 2/1981 | Lagana et al. | |
| 4,260,421 A | 4/1981 | Brown et al. | |
| 4,265,868 A | 5/1981 | Kamody | |
| 4,270,937 A | 6/1981 | Adler et al. | |
| 4,284,416 A | 8/1981 | Nahas | |
| 4,292,048 A | 9/1981 | Wesselhoft et al. | |
| 4,298,584 A | 11/1981 | Makrides | |
| 4,315,753 A | 2/1982 | Bruckenstein et al. | |
| 4,315,758 A | 2/1982 | Patel et al. | |
| 4,318,712 A | 3/1982 | Lang et al. | |
| 4,322,222 A | 3/1982 | Sass | |
| 4,330,305 A | 5/1982 | Kuessner et al. | |
| 4,331,451 A | 5/1982 | Isogaya et al. | |
| 4,334,893 A | 6/1982 | Lang | |
| 4,336,034 A | 6/1982 | Lang et al. | |
| 4,336,233 A | 6/1982 | Appl et al. | |
| 4,344,486 A | 8/1982 | Parrish | |
| 4,347,063 A | 8/1982 | Sherwood et al. | |
| 4,348,486 A | 9/1982 | Calvin et al. | |
| 4,348,487 A | 9/1982 | Goldstein et al. | |
| 4,353,713 A | 10/1982 | Cheng | |
| 4,365,975 A | 12/1982 | Williams et al. | |
| 4,372,755 A | 2/1983 | Tolman et al. | |
| 4,375,362 A | 3/1983 | Moss | |
| 4,397,656 A | 8/1983 | Ketkar | |
| 4,400,182 A | 8/1983 | Davies et al. | |
| 4,407,206 A | 10/1983 | Bartok et al. | |
| 4,428,535 A | 1/1984 | Venetucci | |
| 4,432,773 A | 2/1984 | Euker, Jr. et al. | |
| 4,433,065 A | 2/1984 | van der Burgt et al. | |
| 4,436,028 A | 3/1984 | Wilder | |
| 4,436,531 A | 3/1984 | Estabrook et al. | |
| 4,439,210 A | 3/1984 | Lancet | |
| 4,444,568 A | 4/1984 | Beisswenger et al. | |
| 4,459,138 A | 7/1984 | Soung | |
| 4,462,814 A | 7/1984 | Holmes et al. | |
| 4,466,828 A | 8/1984 | Tamai et al. | |
| 4,468,231 A | 8/1984 | Bartok et al. | |
| 4,478,425 A | 10/1984 | Benko | |
| 4,478,725 A | 10/1984 | Velling et al. | |
| 4,482,529 A | 11/1984 | Chen et al. | |
| 4,491,609 A | 1/1985 | Degel et al. | |
| 4,497,784 A | 2/1985 | Diaz | |
| 4,500,323 A | 2/1985 | Siegfried et al. | |
| 4,505,881 A | 3/1985 | Diaz | |
| 4,508,544 A | 4/1985 | Moss | |
| 4,508,693 A | 4/1985 | Diaz | |
| 4,515,604 A | 5/1985 | Eisenlohr et al. | |
| 4,515,764 A | 5/1985 | Diaz | |
| 4,524,050 A | 6/1985 | Chen et al. | |
| 4,540,681 A | 9/1985 | Kustes et al. | |
| 4,541,841 A | 9/1985 | Reinhardt | |
| 4,551,155 A | 11/1985 | Wood et al. | |
| 4,558,027 A | 12/1985 | McKee et al. | |
| 4,572,826 A | 2/1986 | Moore | |
| 4,594,140 A | 6/1986 | Cheng | |
| 4,597,775 A | 7/1986 | Billimoria et al. | |
| 4,597,776 A | 7/1986 | Ullman et al. | |
| 4,604,105 A | 8/1986 | Aquino et al. | |
| 4,609,388 A | 9/1986 | Adler et al. | |
| 4,609,456 A | 9/1986 | Deschamps et al. | |
| 4,617,027 A | 10/1986 | Lang | |
| 4,619,864 A | 10/1986 | Hendrix et al. | |
| 4,620,421 A | 11/1986 | Brown et al. | |
| 4,661,237 A | 4/1987 | Kimura et al. | |
| 4,668,428 A | 5/1987 | Najjar | |
| 4,668,429 A | 5/1987 | Najjar | |
| 4,675,035 A | 6/1987 | Apffel | |
| 4,678,480 A | 7/1987 | Heinrich et al. | |
| 4,682,986 A | 7/1987 | Lee et al. | |
| 4,690,814 A | 9/1987 | Velenyi et al. | |
| 4,699,632 A | 10/1987 | Babu et al. | |
| 4,704,136 A | 11/1987 | Weston et al. | |
| 4,720,289 A * | 1/1988 | Vaugh et al. | 48/197 R |
| 4,747,938 A | 5/1988 | Khan | |
| 4,781,731 A | 11/1988 | Schlinger | |
| 4,803,061 A | 2/1989 | Najjar et al. | |
| 4,808,194 A | 2/1989 | Najjar et al. | |

(56) References Cited

U.S. PATENT DOCUMENTS

| | | |
|---|---|---|
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |

(56) References Cited

U.S. PATENT DOCUMENTS

| | | |
|---|---|---|
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Brown et al., "Biomass-Derived Hydrogen From a Thermally Ballasted Gasifier", DOE Hydrogen Program Contractors' Review

(56) References Cited

OTHER PUBLICATIONS meeting, May 18-21, 2003, Center for Sustainable Environmental Technologies Iowa State University.
Brown et al., "Biomass-Derived Hydrogen From a thermally Ballasted Gasifier", Final Technical Report, Iowa State University, Aug. 2005.
Chiaramonte et al, "Upgrade Coke by Gasification", (1982) Hydrocarbon Processing, vol. 61 (9), pp. 255-257 (Abstract only).
Gerdes, Kristin, et al., "Integrated Gasification Fuel Cell Performance and Cost Assessment," National Energy Technology Laboratory, U.S. Department of Energy, Mar. 27, 2009, pp. 1-26.
Ghosh, S., et al., "Energy Analysis of a Cogeneration Plant Using Coal Gasification and Solid Oxide Fuel Cell," Energy, 2006, vol. 31, No. 2-3, pp. 345-363.
Jeon, S.K., et al., "Characteristics of Steam Hydrogasification of Wood Using a Micro-Batch Reactor," Fuel, 2007, vol. 86, pp. 2817-2823.
Li, Mu, et al., "Design of Highly Efficient Coal-Based Integrated Gasification Fuel Cell Power Plants," Journal of Power Sources, 2010, vol. 195, pp. 5707-5718.
Prins, M.J., et al., "Exergetic Optimisation of a Production Process of Fischer-Tropsch Fuels from Biomass," Fuel Processing Technology, 2005, vol. 86, No. 4, pp. 375-389.
U.S. Appl. No. 13/484,918, filed May 31, 2012.
U.S. Appl. No. 13/402,022, filed Feb. 22, 2012.
U.S. Appl. No. 13/450,995, filed Apr. 19, 2012.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Coal Conversion Processes (Gasification), Encyclopedia of Chemical Technology, 4$^{th}$ Edition, vol. 6, pp. 541-566.
Cohen, S.J., Project Manager, "Large Pilot Plant Alternatives for Scaleup of the Catalytic Coal Gasification Process," Fe-2480-20, U.S. Dept. of Energy, Contract No. EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
"Integrate Gasification Combined Cycle (IGCC)," WorleyParsons Resources & Energy, http://www.worleyparsons.com/v5/page.aspx?id=164.
U.S. Appl. No. 12/778,538, filed May 12, 2010, Robinson et al.
U.S. Appl. No. 12/778,548, filed May 12, 2010, Robinson et al.
U.S. Appl. No. 12/778,552, filed May 12, 2010, Robinson et al.
Adsorption, http://en.wikipedia.org/wiki/Adsorption, pp. 1-8.
Amine gas treating, http://en.wikipedia.orq/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, pp. 1-5.
Gas separation, http://en.wikipedia.orq/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char, Biomass and Bioenergy, vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as a Construction Material for Highways, A Manual. Federal Highway Administration, Report No. FHWA-IP-76-16, Washington, DC, 1976.
Coal Bottom Ash/Boiler Slag, http://www.p2pays.org/ref/13/12842/cbabs2.htm.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4.
What is XPS?, http://www.nuance.northwestern.edu/Keckll/xps1.asp, pp. 1-2.
2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.
Moulton, Lyle K. "Bottom Ash and Boiler Slag", *Proceedings of the Third International Ash Utilization Symposium*, U.S. Bureau of Mines, Information Circular No. 8640, Washington, DC, 1973.

\* cited by examiner

PROCESSES FOR GASIFICATION OF A CARBONACEOUS FEEDSTOCK

CROSS REFERENCE TO RELATED APPLICATION

This application claims priority under 35 U.S.C. §119 from U.S. Provisional Application Ser. No. 61/098,475 (filed Sep. 19, 2008), the disclosure of which is incorporated by reference herein for all purposes as if fully set forth.

This application is related to commonly owned and concurrently filed U.S. Provisional Patent Application Ser. No. 12/562,919, entitled CHAR METHANATION CATALYST AND ITS USE IN GASIFICATION PROCESSES.

FIELD OF THE INVENTION

The present invention relates to processes for preparing gaseous products, and in particular, methane via the catalytic gasification of carbonaceous feedstocks in the presence of steam, where there is no recycle of carbon monoxide or hydrogen to the catalytic gasifier.

BACKGROUND OF THE INVENTION

In view of numerous factors such as higher energy prices and environmental concerns, the production of value-added gaseous products from lower-fuel-value carbonaceous feedstocks, such as petroleum coke and coal, is receiving renewed attention. The catalytic gasification of such materials to produce methane and other value-added gases is disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1, US2006/0265953A1, US2007/000177A1, US2007/083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217584A1, US2009/0217585A1, US2009/0217590A1, US2009/0217586A1, US2009/0217588A1, US2009/0217589A1, US2009/0217575A1, US2009/0217587A1 and GB1599932.

In general, carbonaceous materials, such as coal or petroleum coke, can be converted to a plurality of gases, including value-added gases such as methane, by the gasification of the material in the presence of an alkali metal catalyst source and steam at elevated temperatures and pressures. Fine unreacted carbonaceous materials are removed from the raw gases produced by the gasifier, the gases are cooled and scrubbed in multiple processes to remove undesirable contaminants and other side-products including carbon monoxide, hydrogen, carbon dioxide, and hydrogen sulfide.

In order to maintain the net heat of reaction as close to neutral as possible (only slightly exothermic or endothermic; i.e., that the reaction is run under thermally neutral conditions) a recycle carbon monoxide and hydrogen gas stream is often fed to the gasification reactors. See, for example, U.S. Pat. No. 4,094,650, U.S. Pat. No. 6,955,595 and US2007/083072A1. Such gas recycle loops generally require at least additional heating elements and pressurization elements to bring the recycle gas stream to a temperature and pressure suitable for introduction into the gasification reactor. Further, such processes for generating methane can require separation of methane from the recycle gases, for example, by cryogenic distillation. In doing so, the engineering complexity and overall cost of producing methane is greatly increased.

Therefore, a need remains for improved gasification methods where gas recycle loops are minimized and/or eliminated to decrease the complexity and cost of producing methane.

SUMMARY OF THE INVENTION

In one aspect, the invention provides a process for generating a plurality of gaseous products from a carbonaceous feedstock, and recovering a methane product stream, the process comprising the steps of:

(a) supplying to an oxygen-blown gasifier (i) a first carbonaceous feedstock, (ii) an oxygen-rich gas stream and (iii) an aqueous stream comprising water and/or steam;

(b) at least partially combusting the first carbonaceous feedstock with the oxygen-rich gas stream in the oxygen-blown gasifier, under suitable temperature and pressure, to generate a first gas stream comprising hydrogen, carbon monoxide and superheated steam;

(c) introducing a second carbonaceous feedstock, a gasification catalyst and the first gas stream to a catalytic gasifier, the catalytic gasifier in communication with the oxygen-blown gasifier;

(d) reacting the second carbonaceous feedstock and the first gas stream in the catalytic gasifier in the presence of the gasification catalyst under suitable temperature and pressure to form a second gas stream comprising a plurality of gaseous products comprising methane, carbon dioxide, hydrogen, carbon monoxide and hydrogen sulfide;

(e) optionally reacting at least a portion of the carbon monoxide and at least a portion of the hydrogen in the second gas stream in a catalytic methanator in the presence of a sulfur-tolerant methanation catalyst to produce a methane-enriched second gas stream;

(f) removing a substantial portion of the carbon dioxide and a substantial portion of the hydrogen sulfide from the second gas stream (or the methane-enriched second gas stream if present) to produce a third gas stream comprising a substantial portion of the methane from the second gas stream (or the methane-enriched second gas stream if present);

(g) optionally, if the third gas stream comprises hydrogen and greater than about 100 ppm carbon monoxide, reacting carbon monoxide and hydrogen present in the third gas stream in a catalytic methanator in the presence of a methanation catalyst to produce a methane-enriched third gas stream; and (h) recovering the third gas stream (or the methane-enriched third gas stream if present), wherein (i) at least one of step (e) and step (g) is present, and (ii) the third gas stream (or the methane-enriched third gas stream if present) is the methane product stream, or the third gas stream (or the methane-enriched third gas stream if present) is purified to generate the methane product stream.

In a second aspect, the invention provides a continuous process for generating a plurality of gaseous products from a carbonaceous feedstock, and recovering a methane product stream, the process comprising the steps of:

(a) continuously supplying to an oxygen-blown gasifier (i) a first carbonaceous feedstock, (ii) an oxygen-rich gas stream and (iii) an aqueous stream comprising water and/or steam;

(b) continuously at least partially combusting the first carbonaceous feedstock with the oxygen-rich gas stream in the oxygen-blown gasifier, under suitable temperature and pressure, to generate a first gas stream comprising hydrogen, carbon monoxide and superheated steam;

(c) continuously introducing a second carbonaceous feedstock, a gasification catalyst and the first gas stream to a catalytic gasifier, the catalytic gasifier in communication with the oxygen-blown gasifier;

(d) continuously reacting the second carbonaceous feedstock and the first gas stream in the catalytic gasifier in the presence of the gasification catalyst under suitable temperature and pressure to form a second gas stream comprising a plurality of gaseous products comprising methane, carbon dioxide, hydrogen, carbon monoxide and hydrogen sulfide;

(e) optionally reacting at least a portion of the carbon monoxide and at least a portion of the hydrogen in the second gas stream in a catalytic methanator in the presence of a sulfur-tolerant methanation catalyst to produce a methane-enriched second gas stream;

(f) continuously removing a substantial portion of the carbon dioxide and a substantial portion of the hydrogen sulfide from the second gas stream (or the methane-enriched second gas stream if present) to produce a third gas stream comprising a substantial portion of the methane from the second gas stream (or the methane-enriched second gas stream if present);

(g) optionally, if the third gas stream comprises hydrogen and greater than about 100 ppm carbon monoxide, reacting carbon monoxide and hydrogen present in the third gas stream in a catalytic methanator in the presence of a methanation catalyst to produce a methane-enriched third gas stream; and (h) recovering the third gas stream (or the methane-enriched third gas stream if present), wherein the third gas stream (or the methane-enriched third gas stream if present) is the methane product stream, or the third gas stream (or the methane-enriched third gas stream if present) is purified to generate the methane product stream, wherein at least one of step (e) and step (g) is present.

The processes in accordance with the present invention can be useful, for example, for producing methane from various carbonaceous feedstocks. A preferred process is one which produces a product stream of "pipeline-quality natural gas" as described in further detail below.

DETAILED DESCRIPTION

Figure 1:
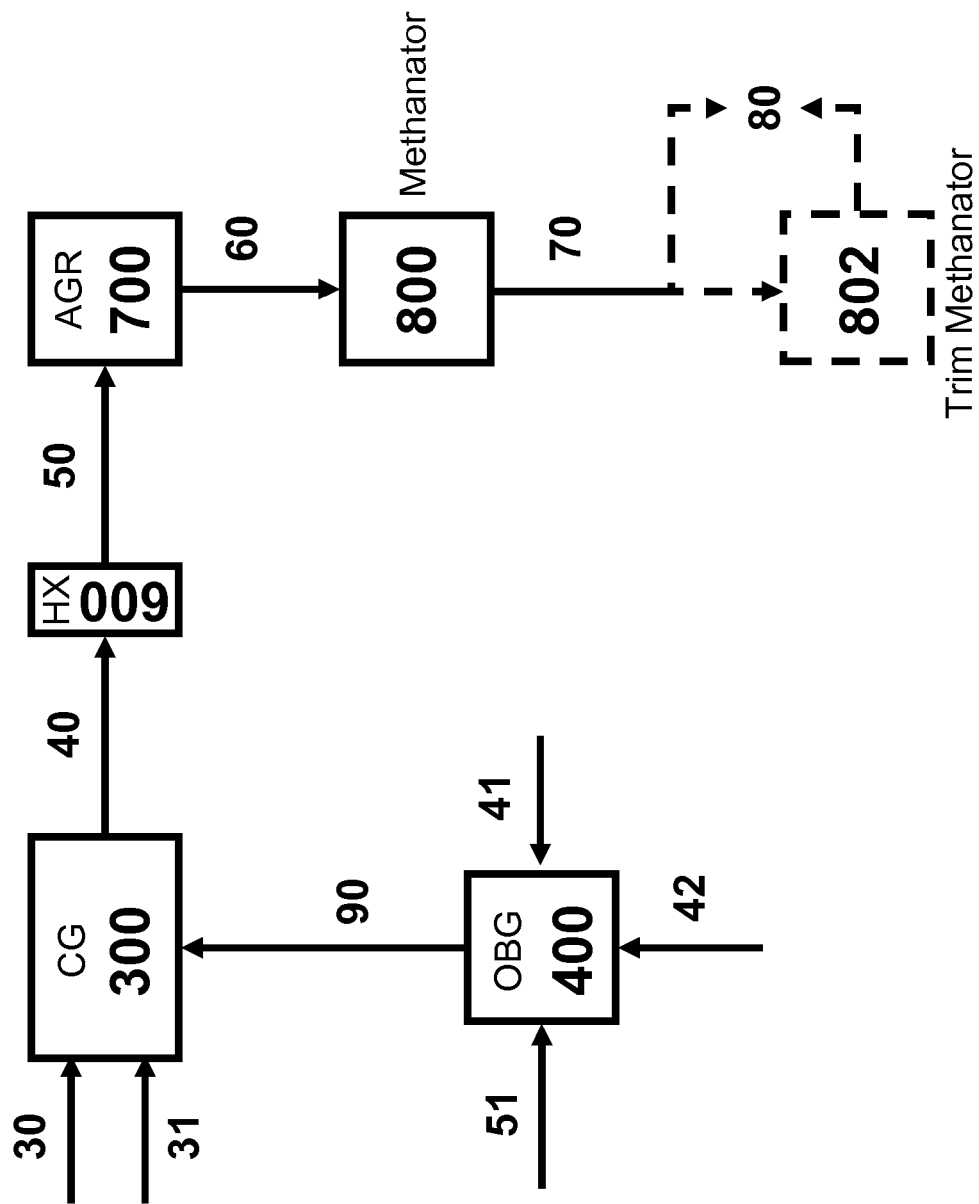
FIG. 1 is a diagram of an embodiment of a gasification process that uses an oxygen-blown gasifier to supply a first gas steam comprising superheated steam, carbon monoxide and hydrogen to a catalytic gasifier; a methanator downstream of an acid gas removal process; and an optional trim methanator.

The present disclosure relates to processes to convert carbonaceous feedstocks into a plurality of gaseous products including at least methane, the processes comprising, among other steps, providing a first carbonaceous feedstock, an oxygen-rich gas stream and an aqueous stream to an oxygen-blown gasifier to generate carbon monoxide, hydrogen and superheated steam for introduction to a catalytic gasifier, and the conversion in the catalytic gasifier of a second carbonaceous feedstock in the presence of an alkali metal catalyst into the plurality of gaseous products. In particular, the present systems can provide improved gasification processes in which there can advantageously be no recycle of carbon monoxide or hydrogen to the catalytic gasifier. The carbon monoxide and hydrogen input desirable for near-equilibrium operation of the catalytic gasification can be supplied instead by the oxygen-blown gasifier. The superheated steam used in the catalytic gasification can also be provided by the oxygen-blown gasifier.

The present invention can be practiced in conjunction with the subject matter disclosed in commonly-owned US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1 and US2009/0217587A1.

Moreover, the present invention can be practiced in conjunction with the subject matter disclosed in commonly-owned U.S. patent application Ser. Nos. 12/395,330 and 12/395,433, each of which was filed 27 Feb. 2009; 12/415,042 and 12/415,050, each of which was filed 31 Mar. 2009; and 12/492,467, 12/492,477, 12/492,484, 12/492,489 and 12/492,497, each of which was filed 26 Jun. 2009.

Further, the present invention can be practiced using developments described in the following commonly owned U.S. Provisional Patent Application, filed on even date herewith, which is hereby incorporated herein by reference its their entirety as if fully set forth: Ser. No. 12/562,919, entitled CHAR METHANATION CATALYST AND ITS USE IN GASIFICATION PROCESSES.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than 95% of the referenced material, and more preferably greater than 97% of the referenced material. The percent is on a molar basis when reference is made to a molecule (such as methane, carbon dioxide, carbon monoxide and hydrogen sulfide), and otherwise is on a weight basis (such as for entrained carbonaceous fines).

The term "carbonaceous material" as used herein can be, for example, biomass and non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see previously incorporated US2009/0217575A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, *eucalyptus*, alfalfa, clover, oil palm, switchgrass, sudangrass, millet, *jatropha*, and *miscanthus* (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see previously incorporated US2009/0166588A1, US2009/0165379A1, US2009/0165380A1, US2009/0165361A1, US2009/0217590A1 and US2009/0217586A1.

The terms "petroleum coke" and "petcoke" as used here includes both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil, which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "asphaltene" as used herein is an aromatic carbonaceous solid at room temperature, and can be derived, from example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material." Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium. U.S. Bureau of Mines, Information Circular No. 8640, Washington, D.C., 1973.

The term "unit" refers to a unit operation. When more than one "unit" is described as being present, those units are operated in a parallel fashion. A single "unit", however, may comprise more than one of the units in series. For example, an acid gas removal unit may comprise a hydrogen sulfide removal unit followed in series by a carbon dioxide removal unit. As another example, a trace contaminant removal unit may comprise a first removal unit for a first trace contaminant followed in series by a second removal unit for a second trace contaminant. As yet another example, a methane compressor unit may comprise a first methane compressor to compress the methane product stream to a first pressure, followed in series by a second methane compressor to further compress the methane product stream to a second (higher) pressure.

The materials, methods, and examples herein are illustrative only and, except as specifically stated, are not intended to be limiting.

Gasification Processes

In one embodiment of the invention, a methane product stream (80) can be generated from a catalyzed carbonaceous feedstock (30) as illustrated in FIG. 1. A first carbonaceous feedstock (41), an oxygen-rich gas stream (42, such as purified oxygen) and an aqueous stream (51) comprising water or steam can be provided to an oxygen-blown gasifier (400). The aqueous stream may be provided to the oxygen-blown gasifier as a separate input of water and/or steam. In some embodiments of the invention, however, at least a portion of the aqueous stream is provided together with the first carbonaceous feedstock, e.g., as a slurry or wet material. In the oxygen-blown gasifier, the first carbonaceous feedstock can be at least partially combusted, under suitable temperature and pressure, to generate a first gas stream (90) comprising carbon monoxide, hydrogen and superheated steam at a temperature above the operating temperature of reactor (300) sufficient to maintain the thermal balance in reactor (300), as discussed in further detail below. As described generally above, and more particularly below, the first gas stream can then be used as an input for a catalytic gasification process.

Because the oxygen-blown gasifier can generate superheated steam, the use of a separate superheater to generate superheated steam for provision to the catalytic gasification process, as disclosed in many of the previously-incorporated references, can advantageously be eliminated. Of course, in certain embodiments of the invention, superheated steam from a separate source can be mixed with the first gas stream (90), and/or can be separately provided to the catalytic gasification process.

The first carbonaceous feedstock (41) typically comprises one or more carbonaceous materials, as discussed below.

As described above, the aqueous stream can comprise water and/or steam. In embodiments of the invention in which the aqueous stream comprises steam, a steam boiler can be used to provide the steam. Any of the steam boilers known to those skilled in the art can supply steam for the oxygen-blown gasifier (400) and/or for mixing with the first gas stream (90) or providing to the catalytic gasification process. Such boilers can be powered, for example, through the use of any carbonaceous material such as powdered coal, biomass etc., and including but not limited to rejected carbonaceous materials from the feedstock preparation operations (e.g., fines, supra). Steam can also be supplied from an additional gasifier coupled to a combustion turbine where the exhaust from the reactor is thermally exchanged to a water source and produce steam. Alternatively, the steam may be generated for the catalytic gasifiers as described in previously incorporated US2009/0165376A1, US2009/0217584A1 and US2009/0217585A1.

Steam recycled or generated from other process operations can also be used as a sole steam source, or in combination with the steam from a steam generator, to supply steam to the oxygen-blown gasifier (400), and/or for mixing with the first gas stream (90) or provided directly to the catalytic gasification process. For example, when the slurried carbonaceous materials are dried with a fluid bed slurry drier, as discussed below for the preparation of the catalyzed carbonaceous feedstock (30), the steam generated through vaporization can be fed to the oxygen-blown gasifier (400), or mixed with the first gas stream (90), or provided directly to the catalytic gasification process. Further, steam generated by a heat exchanger unit (such as 600) can be fed to the oxygen-blown gasifier (400), or used for mixing with the first gas stream (90), or provided directly to the catalytic gasification process.

In certain embodiments of the invention, the hydrogen and carbon monoxide are present in the first gas stream in a molar ratio of about 3:1.

A second carbonaceous feedstock (30), a gasification catalyst (31) and the first gas stream (90) are provided to a catalytic gasifier (300) that is in communication with the oxygen-blown gasifier (400). The second carbonaceous feedstock and the first gas stream can be reacted in the catalytic gasifier (300) in the presence of the gasification catalyst (31) and under suitable pressure and temperature conditions to form a hot second gas stream (40) comprising a plurality of gaseous products comprising methane, carbon dioxide, hydrogen, carbon monoxide, and hydrogen sulfide. The second carbonaceous feedstock (30) typically comprises one or more carbonaceous materials, as discussed below. The gasification catalyst (31) can comprise one or more catalyst species, as discussed below. The second carbonaceous feedstock and the gasification catalyst can be intimately mixed (i.e., to provide a catalyzed carbonaceous feedstock) before provision to the catalytic gasifier.

The gasification reactors (i.e., catalytic gasifiers and oxygen-blown gasifiers) for such processes are typically operated at moderately high pressures and temperatures (with the oxygen-blown gasifier typically being operated at a higher pressure and temperature than the catalytic gasifier), requiring introduction of the appropriate carbonaceous feedstock to a reaction chamber of the gasification reactor while maintaining the required temperature, pressure, and flow rate of the feedstock. Those skilled in the art are familiar with feed inlets to supply the carbonaceous feedstock into the reaction chambers having high pressure and/or temperature environments, including, star feeders, screw feeders, rotary pistons, and lock-hoppers. It should be understood that the feed inlets can include two or more pressure-balanced elements, such as lock hoppers, which would be used alternately. In some instances, the carbonaceous feedstock can be prepared at pressure conditions above the operating pressure of gasification reactor. Hence, the particulate composition can be directly passed into the gasification reactor without further pressurization.

Any of several types of gasification reactors can be utilized. Suitable gasification reactors include those having a reaction chamber which is a counter-current fixed bed, a co-current fixed bed, a fluidized bed, or an entrained flow or moving bed reaction chamber.

Gasification in the catalytic gasifier is typically affected at moderate temperatures of at least about 450° C., or of at least about 600° C., or of at least about 650° C., to about 900° C., or to about 800° C., or to about 750° C.; and at pressures of at least about 50 psig, or at least about 200 psig, or at least about 400 psig, to about 1000 psig, or to about 700 psig, or to about 600 psig.

The oxygen-blown gasifier will normally be maintained at or above about 500° C., or at or above about 650° C., and at or below about 1000° C., or at or below about 900° C.; and the pressure will be at least about 200 psig, or at least about 400 psig, or at least about 600 psig, or at least about 1000 psig, up to about 1500 psig, or up to about 2000 psig, and in particular, about 600 psig to about 2000 psig, or about 1000 psig to about 2000 psig.

As indicated above, gasification in the oxygen blown gasifier is typically affected a higher temperature and pressure than in the catalytic gasifier. The oxygen-blown gasifier will typically be operated at temperatures ranging from about 50° C. to about 250° C., and pressures of from at least about 50 psig, or at least about 100 psig, or at least about 200 psig, to about 1000 psig, or to about 750 psig, or to about 500 psig, above the operating conditions in the catalytic gasifier. The oxygen-blown gasifier should, however, be operated under non-slagging conditions to prevent the passing of feedstock ash and other contaminants into the catalytic gasifier. These contaminants are typically removed from the oxygen-blown gasifier as bottom ash or char.

The gas utilized in the catalytic gasifier for pressurization and reactions of the particulate composition comprises the first gas stream and, optionally, additional steam, oxygen, nitrogen, air, or inert gases such as argon, which can be supplied to the catalytic gasifier according to methods known to those skilled in the art. As a consequence, the first gas stream must be provided at a higher pressure which allows it to enter the catalytic gasifier.

The gas utilized in the oxygen-blown gasification reactor for pressurization and reactions of the particulate composition can comprises the oxygen-rich gas stream and, optionally, nitrogen, steam or inert gases such as argon, which can be supplied to the oxygen-blown gasification reactor according to methods known to those skilled in the art.

Further details concerning the catalytic gasifier and oxygen-blown gasifier can be found in many of the previously incorporated references, for example, previously incorporated US2009/0165376A1.

The catalytic conversion of a carbon source to methane that occurs in the catalytic gasifier typically involves three separate reactions:

Steam carbon: $C+H_2O \rightarrow CO+H_2$ (I)

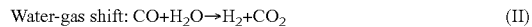

Water-gas shift: $CO+H_2O \rightarrow H_2+CO_2$ (II)

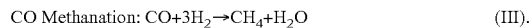

CO Methanation: $CO+3H_2 \rightarrow CH_4+H_2O$ (III).

These three reactions are together essentially thermally balanced; however, due to process heat losses and other energy requirements (such as required for evaporation of moisture entering the gasifier with the feedstock), some heat must be added to the catalytic gasifier to maintain the thermal balance. The superheating of the first gas stream to a temperature above the operating temperature of the catalytic gasifier, via the oxygen-blown gasifier, can be the primary mechanism for supplying this extra heat. As mentioned previously, this allows the process to be configured without a separate superheater.

A person of ordinary skill in the art can determined the amount of heat required to be added to the catalytic gasifier to substantially maintain thermal balance. When considered in conjunction with flow rate and composition of the first gas stream (and other factors recognizable to those of ordinary skill in the relevant art), this will in turn dictate the temperature and pressure of the first gas stream as it enters the catalytic gasifier (and in turn the operating temperature and pressure of the oxygen-blown gasifier).

The hot gas effluent leaving the reaction chamber of the catalytic gasifier can pass through a fines remover unit portion of the gasifier which serves as a disengagement zone where particles too heavy to be entrained by the gas leaving the catalytic gasifier (i.e., fines) are returned to the reaction chamber (e.g., fluidized bed). The fines remover unit can include one or more internal and/or external cyclone separators or similar devices to remove fines and particulates from the hot gas effluent. The resulting gas stream leaving the catalytic gasifier generally comprises $CH_4$, $CO_2$, $H_2$, CO, $H_2S$, unreacted steam, entrained fines, and optionally, other contaminants such as $NH_3$, COS, HCN and/or elemental mercury vapor, depending on the nature of the carbonaceous material utilized for gasification.

Residual entrained fines may be substantially removed, when necessary, by any suitable device such as external cyclone separators optionally followed by Venturi scrubbers. The recovered fines can be processed to recover alkali metal catalyst, or directly recycled back to feedstock preparation as described in previously incorporated US2009/0217589A1.

Removal of a "substantial portion" of fines means that an amount of fines is removed from the resulting gas stream such that downstream processing is not adversely affected; thus, at least a substantial portion of fines should be removed. Some minor level of ultrafine material may remain in the resulting gas stream to the extent that downstream processing is not significantly adversely affected. Typically, at least about 90 wt %, or at least about 95 wt %, or at least about 98 wt %, of the fines of a particle size greater than about 20 μm, or greater than about 10 μm, or greater than about 5 μm, are removed.

The second gas stream (40), upon exiting reactor (300), will typically comprise at least about 20 mol % methane based on the moles of methane, carbon dioxide, carbon monoxide and hydrogen in the second gas stream. In addition, the second gas stream will typically comprise at least about 50 mol % methane plus carbon dioxide, based on the moles of methane, carbon dioxide, carbon monoxide and hydrogen in the second gas stream.

The hot second gas stream (40) may be, for example, provided to a heat exchanger (600), as shown in FIG. 1. The heat exchanger (600) reduces the temperature of the hot second gas stream to generate a cooled second gas stream (50) having a temperature less than the hot second gas stream (40). The cooled second gas stream can be, for example, provided to an acid gas removal (AGR) process (700) as described below.

Depending on catalytic gasification conditions, the hot second gas stream (40) can be generated having at a temperature ranging from about 450° C. to about 900° C. (more typically from about 650° C. to about 800° C.), a pressure of from about 50 psig to about 1000 psig (more typically from about 400 psig to about 600 psig), and a velocity of from about 0.5 ft/sec to about 2.0 ft/sec (more typically from about 1.0 ft/sec to about 1.5 ft/sec). The heat energy extracted by any one or more of the heat exchanger units (600), when present, can, for example, be used to generate steam, which can be utilized, for example, as a portion of the steam supplied to the oxygen-blown gasifier (400) or for mixing with the first gas stream (90) or provision to the catalytic gasifier (300), as discussed above. The resulting cooled second gas stream (50) will typically exit the heat exchanger (600) at a temperature ranging from about 250° C. to about 600° C. (more typically from about 300° C. to about 500° C.), a pressure of from about 50 psig to about 1000 psig (more typically from about 400 psig to about 600 psig), and a velocity of from about 0.5 ft/sec to about 2.5 ft/sec (more typically from about 1.0 ft/sec to about 1.5 ft/sec).

Subsequent acid gas removal processes (700) can be used to remove a substantial portion of $H_2S$ and $CO_2$ from the second gas stream (e.g., the cooled second gas stream (50), or a methane-enriched gas stream as described infra) and generate a third gas stream (60). Acid gas removal processes typically involve contacting the cooled second gas stream (50) with a solvent such as monoethanolamine, diethanolamine, methyldiethanolamine, diisopropylamine, diglycolamine, a solution of sodium salts of amino acids, methanol, hot potassium carbonate or the like to generate $CO_2$ and/or $H_2S$ laden absorbers. One method can involve the use of Selexol® (UOP LLC, Des Plaines, Ill. USA) or Rectisol® (Lurgi AG, Frankfurt am Main, Germany) solvent having two trains; each train consisting of an $H_{2S}$ absorber and a $CO_2$ absorber.

The resulting third gas stream (60) can comprise $CH_4$, $H_2$, and, optionally, CO when the sour shift unit (infra) is not part of the process, and typically, small amounts of $CO_2$ and $H_2O$. One method for removing acid gases from the cooled second gas stream (50) is described in previously incorporated US2009/0220406A1.

At least a substantial portion (e.g., substantially all) of the $CO_2$ and/or $H_{2S}$ (and other remaining trace contaminants) should be removed via the acid gas removal processes. "Substantial" removal in the context of acid gas removal means removal of a high enough percentage of the component such that a desired end product can be generated. The actual amounts of removal may thus vary from component to component. For "pipeline-quality natural gas", only trace amounts (at most) of $H_{2S}$ can be present, although higher amounts of $CO_2$ may be tolerable.

Typically, at least about 85%, or at least about 90%, or at least about 92%, of the $CO_2$, and at least about 95%, or at least about 98%, or at least about 99.5%, of the $H_2S$, should be removed from the cooled second gas stream (50).

Losses of desired product (methane) in the acid gas removal step should be minimized such that the third gas stream (60) comprises at least a substantial portion (and substantially all) of the methane from the cooled second gas stream (50). Typically, such losses should be about 2 mol % or less, or about 1.5 mol % or less, or about 1 mol % of less, of the methane from the cooled second gas stream (50).

The gasification processes described herein utilize at least one methanation step to generate methane from the carbon monoxide and hydrogen present in one or more of the second gas stream (e.g., the hot second gas stream (40) and/or the cooled second gas stream (50)), and third gas stream (60). For example, in one embodiment of the invention, at least a portion of the carbon monoxide and at least a portion of the hydrogen in the second gas stream is reacted in a catalytic methanator in the presence of a sulfur-tolerant methanation catalyst to produce a methane-enriched second gas stream, which can then be subjected to acid gas removal as described above (i.e., step (e) is performed). In other embodiments of the invention, if the third gas stream comprises hydrogen and greater than about 100 ppm carbon monoxide, carbon monoxide and hydrogen present in the third gas stream are reacted in a catalytic methanator in the presence of a methanation catalyst to produce a methane-enriched third gas stream (i.e., step (g) is performed). In certain embodiments of the invention, both of these methanation steps (i.e., (e) and (g)) can be performed.

For example, in the embodiment shown in FIG. 1, the third gas stream (60) may be passed to a catalytic methanator (800), in which carbon monoxide and hydrogen present in the third gas stream (60) can be reacted to generate methane, thereby generating a methane-enriched third gas stream (70) (i.e., step (g) is present in the process). In various embodiments, the methane-enriched third gas stream (70) is the methane product stream (80). In various other embodiments, the methane-enriched third gas stream (70) can be further purified to generate the methane product stream (80). Further purifications processes include, but are not limited to, additional trim methanators (e.g., 802 in FIG. 1), cryogenic separators and membrane separators.

Figure 2:
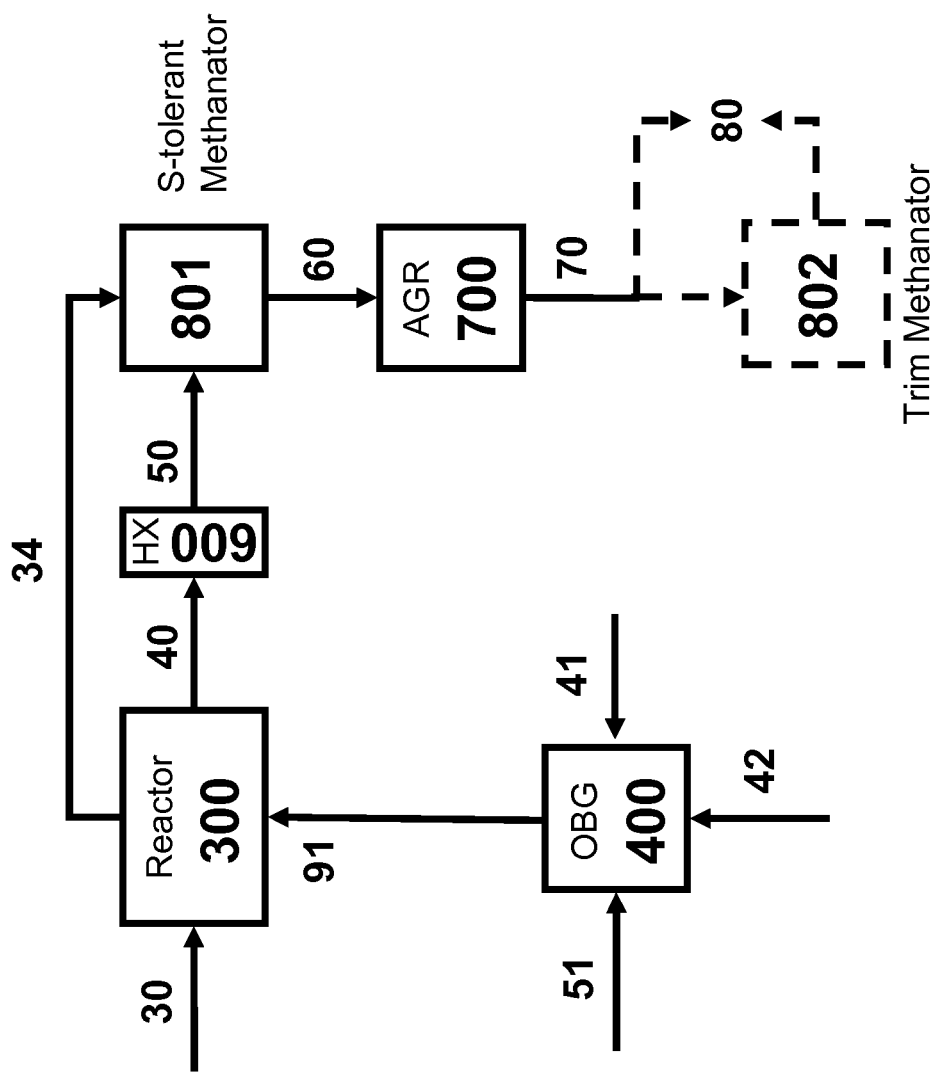
FIG. 2 is a diagram of an embodiment of a gasification process that uses an oxygen-blown gasifier to supply a first gas steam comprising superheated steam, carbon monoxide and hydrogen to a catalytic gasifier; a sulfur-tolerant methanator upstream of acid gas removal operations and an optional trim methanator downstream of the acid gas removal processes.

In another embodiment, as illustrated in FIG. 2, the cooled second (50) gas stream can be passed to a sulfur-tolerant catalytic methanator (801) where carbon monoxide and hydrogen in the cooled second (50) gas stream can be reacted to generate methane, thereby generating a methane-enriched second gas stream (60) (i.e., step (e) is present in the process). In other embodiments of the invention, the sulfur-tolerant catalytic methanation step can be performed before heat exchange, or without heat exchange (i.e., the sulfur-tolerant catalytic methanation is performed directly on the hot second gas stream (40). The second gas stream (e.g., the hot second (40) or cooled second (50) gas stream) typically contains significant quantities of hydrogen sulfide, which can deactivate methanation catalysts as is familiar to those skilled in the art. Therefore, in such embodiments, the catalytic methanator (801) comprises a sulfur-tolerant methanation catalyst such as molybdenum and/or tungsten sulfides. Further examples of sulfur-tolerant methanation catalysts include, but are not limited to, catalysts disclosed in U.S. Pat. No. 4,243,554 U.S. Pat. No. 4,243,553, U.S. Pat. No. 4,006,177, U.S. Pat. No. 3,958,957, U.S. Pat. No. 3,928,000, U.S. Pat. No. 2,490,488, Mills and Steffgen, in Catalyst Rev. 8, 159 (1973), and Schultz et al, U.S. Bureau of Mines, Rep. Invest. No. 6974 (1967).

In one particular example, as shown in FIG. 2, the sulfur-tolerant methanation catalyst is a portion of the char product (34) generated by the catalytic gasifier (300), as is described in commonly owned and concurrently filed US patent application Ser. No. 12/562,919, entitled CHAR METHANATION CATALYST AND ITS USE IN GASIFICATION SYSTEMS. Operating conditions for a methanator utilizing the char can be similar to those set forth in previously incorporated U.S. Pat. No. 3,958,957. When one or more methanation steps are included in an integrated gasification process that employ at least a portion of the char product as the sulfer-tolerant methanation catalyst, e.g., such as the integrated gasification process shown in FIGS. 3 and 4, the methanation temperatures generally range from about 450° C., or from about 475° C., or from about 500° C., to about 650° C., or to about 625° C., or to about 600° C. and at a pressure from about 400 to about 750 psig.

Any remaining portion of the char can be processed to recover and recycle entrained catalyst compounds, as discussed below.

Continuing with FIG. 2, the methane-enriched second gas stream (60) can be provided to a subsequent acid gas removal process (700), as described previously, to remove a substantial portion of $H_2S$ and $CO_2$ from the methane-enriched second gas stream (60) and generate a third gas stream (70). In various embodiments, the third gas stream (70) can be the methane product stream (80).

In other embodiments, the third gas stream (70) can contain appreciable amounts of carbon monoxide and hydrogen. In such examples, the third gas stream (70) can be provided to a methanator (802) (e.g., a trim methanator), in which carbon monoxide and hydrogen present in the third gas stream (70) can be reacted under suitable temperature and pressure conditions to generated methane, thereby generating a methane-enriched third gas stream (80) (e.g., steps (e) and (g) as described above).

In a particular example, the third gas stream (70), when it contains appreciable amounts of CO (e.g., greater than about 100 ppm CO), can be further enriched in methane by performing trim methanation to reduce the CO content. One may carry out trim methanation using any suitable method and apparatus known to those of skill in the art, including, for example, the method and apparatus disclosed in U.S. Pat. No. 4,235,044, incorporated herein by reference.

The invention provides systems that, in certain embodiments, are capable of generating "pipeline-quality natural gas" from the catalytic gasification of carbonaceous materials. A "pipeline-quality natural gas" typically refers to a natural gas that is (1) within ±5% of the heating value of pure methane (whose heating value is 1010 btu/ft$^3$ under standard atmospheric conditions), (2) substantially free of water (typically a dew point of about −40° C. or less), and (3) substantially free of toxic or corrosive contaminants. In some embodiments of the invention, the methane product stream described in the above processes satisfies such requirements.

Examples of Specific Embodiments

As described in more detail below, in one embodiment of the invention, the gasification catalyst can comprise an alkali metal gasification catalyst.

As described in more detail below, in certain embodiments of the first carbonaceous feedstock and the second carbonaceous feedstock can each comprise any of a number of carbonaceous materials. For example, in one embodiment of the invention, the first carbonaceous feedstock and the second carbonaceous feedstock each independently comprise one or more of anthracite, bituminous coal, sub-bituminous coal, lignite, petroleum coke, asphaltenes, liquid petroleum residues or biomass. The first carbonaceous feedstock can have substantially the same composition as the second carbonaceous feedstock. In other embodiments of the invention, the first carbonaceous feedstock can have a different composition than the second carbonaceous feedstock.

As described in more detail below, in certain embodiments of the invention, the second carbonaceous feedstock is loaded with a gasification catalyst (i.e., to form a catalyzed carbonaceous feedstock) prior to its introduction into the catalytic gasifier. For example, the whole of the second carbonaceous feedstock can be loaded with catalysts, or only part of the second carbonaceous feedstock can be loaded with catalyst. Of course, in other embodiments of the invention, the second carbonaceous feedstock is not loaded with a gasification catalyst before it is introduced into the catalytic gasifier.

As described in more detail below, in certain embodiments of the invention the second carbonaceous feedstock is loaded with an amount of an alkali metal gasification catalyst sufficient to provide a ratio of alkali metal atoms to carbon atoms ranging from about 0.01 to about 0.10.

In certain embodiments of the invention, the second carbonaceous feedstock, gasification catalyst and first gas stream are introduced into a plurality of catalytic gasifiers. For example, a single oxygen-blown gasifier can supply the first gas stream to a plurality of gasifiers. In certain embodiments of the invention, a single oxygen-blown gasifier can provide sufficient carbon monoxide, hydrogen and superheated steam to run catalytic gasifications in more than one catalytic gasifier. The second gas streams emerging from the separate catalytic gasifiers can be then further treated separately, or can be recombined at any point in the downstream process.

As the person of skill in the art will appreciate, the processes described herein can be performed, for example, as continuous processes or batch processes.

In certain embodiments of the invention, as shown in FIGS. 1-4, the process is a once-through process. In a "once-through" process, there exists no recycle of carbon-based gas into the gasifier from any of the gas streams downstream from the catalytic gasifier. However, in other embodiments of the invention, the process can include a recycle carbon-based gas stream. For example, to supplement the hydrogen and/or carbon monoxide in the first gas stream such as in start up conditions, a methane-containing stream (taken from, e.g., a second gas stream, a third gas stream or a methane product stream) can be reformed in a reformer to form carbon monoxide and hydrogen, which can be admitted to the catalytic gasifier along with the first gas stream, the second carbonaceous feedstock and the gasification catalyst. In continuous operation, however, it is desirable to operate the process as a "once-through" process.

The processes of the present invention can be practiced without the use of a carbon fuel-fired superheater. Accordingly, in certain embodiments of the invention, no carbon fuel-fired superheater is present.

Pipeline-quality natural gas can contain gases other than methane, as long as the resulting gas mixture has a heating value that is within ±5% of 1010 btu/ft$^3$ and is neither toxic nor corrosive. Therefore, a methane product stream can comprise gases whose heating value is less than that of methane and still qualify as a pipeline-quality natural gas, as long as the presence of other gases does not lower the gas stream's heating value below 950 btu/scf (dry basis). A methane product stream can, for example, comprise up to about 4 mol % hydrogen and still serve as a pipeline-quality natural gas.

Carbon monoxide has a higher heating value than hydrogen; thus, pipeline-quality natural gas could contain even higher percentages of CO without degrading the heating value of the gas stream. A methane product stream that is suitable for use as pipeline-quality natural gas preferably has less than about 1000 ppm CO.

Preparation of Carbonaceous Feedstocks (a) Carbonaceous Materials Processing

Carbonaceous materials, such as biomass and non-biomass (supra), can be prepared via crushing and/or grinding, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates in may be sized (i.e., separated according to size) to provide a processed feedstock for use as the first carbonaceous feedstock or the second carbonaceous feedstock, or for use in a catalyst loading process to form a catalyzed carbonaceous feedstock.

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

The carbonaceous particulate can be supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluid bed gasification reactor is used, such carbonaceous particulates can have an average particle size which enables incipient fluidization of the carbonaceous materials at the gas velocity used in the fluid bed gasification reactor.

Additionally, certain carbonaceous materials, for example, corn stover and switchgrass, and industrial wastes, such as saw dust, either may not be amenable to crushing or grinding operations, or may not be suitable for use in the oxygen-blown gasification reactor or the catalytic gasifier, for example due to ultra fine particle sizes. Such materials may be formed into pellets or briquettes of a suitable size for crushing or for direct use in, for example, a fluid bed gasification reactor. Generally, pellets can be prepared by compaction of one or more carbonaceous material, see for example, previously incorporated US2009/0218424A1. In other examples, a biomass material and a coal can be formed into briquettes as described in U.S. Pat. Nos. 4,249,471, 4,152,119 and 4,225,457. Such pellets or briquettes can be used interchangeably with the preceding carbonaceous particulates in the following discussions.

Additional feedstock processing steps may be necessary depending on the qualities of carbonaceous material sources. Biomass may contain high moisture contents, such as green plants and grasses, and may require drying prior to crushing. Municipal wastes and sewages also may contain high moisture contents which may be reduced, for example, by use of a press or roll mill (e.g., U.S. Pat. No. 4,436,028). Likewise, non-biomass such as high-moisture coal, can require drying prior to crushing. Some caking coals can require partial oxidation to simplify gasification reactor operation. Non-biomass feedstocks deficient in ion-exchange sites, such as anthracites or petroleum cokes, can be pre-treated to create additional ion-exchange sites to facilitate catalyst loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Oxidative pre-treatment can be accomplished using any oxidant known to the art.

The ratio of the carbonaceous materials in the carbonaceous particulates can be selected based on technical considerations, processing economics, availability, and proximity of the non-biomass and biomass sources. The availability and proximity of the sources for the carbonaceous materials can affect the price of the feeds, and thus the overall production costs of the catalytic gasification process. For example, the biomass and the non-biomass materials can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

Significantly, the carbonaceous material sources, as well as the ratio of the individual components of the carbonaceous particulates, for example, a biomass particulate and a non-biomass particulate, can be used to control other material characteristics of the carbonaceous particulates. Non-biomass materials, such as coals, and certain biomass materials, such as rice hulls, typically include significant quantities of inorganic matter including calcium, alumina and silica which form inorganic oxides (i.e., ash) in the catalytic gasifier. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the catalytic gasifier, a solid purge of char comprising ash, unreacted carbonaceous material, and various alkali metal compounds (both water soluble and water insoluble) can be routinely withdrawn.

In preparing the carbonaceous particulates, the ash content of the various carbonaceous materials can be selected to be, for example, about 20 wt % or less, or about 15 wt % or less, or about 10 wt % or less, or about 5 wt % or less, depending on, for example, the ratio of the various carbonaceous materials and/or the starting ash in the various carbonaceous materials. In other embodiments, the resulting the carbonaceous particulates can comprise an ash content ranging from about 5 wt %, or from about 10 wt %, to about 20 wt %, or to about 15 wt %, based on the weight of the carbonaceous particulate. In other embodiments, the ash content of the carbonaceous particulate can comprise less than about 20 wt %, or less than about 15 wt %, or less than about 10 wt %, or less than about 8 wt %, or less than about 6 wt % alumina, based on the weight of the ash. In certain embodiments, the carbonaceous particulates can comprise an ash content of less than about 20 wt %, based on the weight of processed feedstock where the ash content of the carbonaceous particulate comprises less than about 20 wt % alumina, or less than about 15 wt % alumina, based on the weight of the ash.

Such lower alumina values in the carbonaceous particulates allow for, ultimately, decreased losses of alkali catalysts in the catalytic gasification part of the process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall gasification process.

Additionally, the resulting carbonaceous particulates can have a significantly higher % carbon, and thus btu/lb value and methane product per unit weight of the carbonaceous particulate. In certain embodiments, the resulting carbonaceous particulates can have a carbon content ranging from about 75 wt %, or from about 80 wt %, or from about 85 wt %, or from about 90 wt %, up to about 95 wt %, based on the combined weight of the non-biomass and biomass.

In one example, a non-biomass and/or biomass is wet ground and sized (e.g., to a particle size distribution of from about 25 to about 2500 μm) and then drained of its free water (i.e., dewatered) to a wet cake consistency. Examples of suitable methods for the wet grinding, sizing, and dewatering are known to those skilled in the art; for example, see previously incorporated US2009/0048476A1. The filter cakes of the non-biomass and/or biomass particulates formed by the wet grinding in accordance with one embodiment of the present disclosure can have a moisture content ranging from about 40% to about 60%, or from about 40% to about 55%, or below 50%. It will be appreciated by one of ordinary skill in the art that the moisture content of dewatered wet ground carbonaceous materials depends on the particular type of carbonaceous materials, the particle size distribution, and the particular dewatering equipment used. Such filter cakes can be thermally treated, as described herein, to produce one or more reduced moisture carbonaceous particulates which are passed to the catalyst loading unit operation.

Each of the one or more carbonaceous particulates can have a unique composition, as described above. For example, two carbonaceous particulates can be utilized in a particular carbonaceous feedstock, where a first carbonaceous particulate comprises one or more biomass materials and the second carbonaceous particulate comprises one or more non-biomass materials. Alternatively, a single carbonaceous particulate comprising one or more carbonaceous materials utilized in a particular carbonaceous feedstock.

(b) Catalyst Loading

As described above, the second carbonaceous feedstock can associated with a gasification catalyst before being provided to the catalytic gasifier. The one or more carbonaceous particulates (i.e. the second carbonaceous feedstock) are further processed to associate at least one gasification catalyst, typically comprising a source of at least one alkali metal, to generate a catalyzed carbonaceous feedstock.

The second carbonaceous feedstock can be either entirely treated to form a catalyzed carbonaceous feedstock which is passed to the catalytic gasifier (300), or split into one or more processing streams, where at least one of the processing streams is associated with a gasification catalyst to form at least one catalyst-treated feedstock stream. The remaining processing streams can be, for example, treated to associate a second component therewith. Additionally, the catalyst-treated feedstock stream can be treated a second time to associate a second component therewith. The second component can be, for example, a second gasification catalyst, a co-catalyst, or other additive.

In one example, the primary gasification catalyst (e.g., a potassium and/or sodium source) can be provided to the second carbonaceous feedstock, followed by a separate treatment to provide one or more co-catalysts and/or additives (e.g., a calcium source) to the material to yield the catalyzed carbonaceous feedstock. For example, see previously incorporated US2009/0217590A1 and US2009/0217586A1. The gasification catalyst and second component can also be provided as a mixture in a single treatment to the single carbonaceous particulate to yield the catalyzed carbonaceous feedstock.

When one or more carbonaceous particulates are provided for catalyst loading, then at least one of the carbonaceous particulates is associated with a gasification catalyst to form at least one catalyst-treated feedstock stream. Further, any of the carbonaceous particulates can be split into one or more processing streams as detailed above for association of a second or further component therewith. The resulting streams can be blended in any combination to provide the catalyzed carbonaceous feedstock, provided at least one catalyst-treated feedstock stream is utilized to form the catalyzed feedstock stream.

In one embodiment, at least one carbonaceous particulate is associated with a gasification catalyst and optionally, a second component. In another embodiment, each carbonaceous particulate is associated with a gasification catalyst and optionally, a second component.

Any methods known to those skilled in the art can be used to associate one or more gasification catalysts with any of the carbonaceous particulates and/or processing streams. Such methods include but are not limited to, admixing with a solid catalyst source and impregnating the catalyst onto the processed carbonaceous material. Several impregnation methods known to those skilled in the art can be employed to incorporate the gasification catalysts. These methods include but are not limited to, incipient wetness impregnation, evaporative impregnation, vacuum impregnation, dip impregnation, ion exchanging, and combinations of these methods.

In one embodiment, an alkali metal gasification catalyst can be impregnated into one or more of the carbonaceous particulates and/or processing streams by slurrying with a solution (e.g., aqueous) of the catalyst in a loading tank. When slurried with a solution of the catalyst and/or co-catalyst, the resulting slurry can be dewatered to provide a catalyst-treated feedstock stream, again typically, as a wet cake. The catalyst solution can be prepared from any catalyst source in the present processes, including fresh or make-up catalyst and recycled catalyst or catalyst solution. Methods for dewatering the slurry to provide a wet cake of the catalyst-treated feedstock stream include filtration (gravity or vacuum), centrifugation, and a fluid press.

One particular method suitable for combining a coal particulate and/or a processing stream comprising coal with a gasification catalyst to provide a catalyst-treated feedstock stream is via ion exchange as described in previously incorporated US2009/0048476A1. Catalyst loading by an ion exchange mechanism can be maximized based on adsorption isotherms specifically developed for the coal, as discussed in the incorporated reference. Such loading provides a catalyst-treated feedstock stream as a wet cake. Additional catalyst retained on the ion-exchanged particulate wet cake, including inside the pores, can be controlled so that the total catalyst target value can be obtained in a controlled manner. The catalyst loaded and dewatered wet cake may contain, for example, about 50 wt % moisture. The total amount of catalyst loaded can be controlled by controlling the concentration of catalyst components in the solution, as well as the contact time, temperature and method, as can be readily determined by those of ordinary skill in the relevant art based on the characteristics of the starting coal.

In another example, one of the carbonaceous particulates and/or processing streams can be treated with the gasification catalyst and a second processing stream can be treated with a second component (see previously incorporated US2007/0000177A1).

The carbonaceous particulates, processing streams, and/or catalyst-treated feedstock streams resulting from the preceding can be blended in any combination to provide the catalyzed carbonaceous feedstock, provided at least one catalyst-treated feedstock stream is utilized to form the catalyzed carbonaceous feedstock. Ultimately, the catalyzed carbonaceous feedstock is passed onto the catalytic gasifier(s) (300).

Generally, each catalyst loading unit comprises at least one loading tank to contact one or more of the carbonaceous particulates and/or processing streams with a solution comprising at least one gasification catalyst, to form one or more catalyst-treated feedstock streams. Alternatively, the catalytic component may be blended as a solid particulate into one or more carbonaceous particulates and/or processing streams to form one or more catalyst-treated feedstock streams.

Typically, the gasification catalyst is present in the catalyzed carbonaceous feedstock in an amount sufficient to provide a ratio of alkali metal atoms to carbon atoms in the particulate composition ranging from about 0.01, or from about 0.02, or from about 0.03, or from about 0.04, to about 0.10, or to about 0.08, or to about 0.07, or to about 0.06.

With some feedstocks, the alkali metal component may also be provided within the catalyzed carbonaceous feedstock to achieve an alkali metal content of from about 3 to about 10 times more than the combined ash content of the carbonaceous material in the catalyzed carbonaceous feedstock, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the previously incorporated references.

The one or more catalyst-treated feedstock streams that are combined to form the catalyzed carbonaceous feedstock typically comprise greater than about 50%, greater than about 70%, or greater than about 85%, or greater than about 90% of the total amount of the loaded catalyst associated with the catalyzed carbonaceous feedstock. The percentage of total loaded catalyst that is associated with the various catalyst-treated feedstock streams can be determined according to methods known to those skilled in the art.

Separate carbonaceous particulates, catalyst-treated feedstock streams, and processing streams can be blended appropriately to control, for example, the total catalyst loading or other qualities of the catalyzed carbonaceous feedstock, as discussed previously. The appropriate ratios of the various streams that are combined will depend on the qualities of the carbonaceous materials comprising each as well as the desired properties of the catalyzed carbonaceous feedstock. For example, a biomass particulate stream and a catalyzed non-biomass particulate stream can be combined in such a ratio to yield a catalyzed carbonaceous feedstock having a predetermined ash content, as discussed previously.

Any of the preceding catalyst-treated feedstock streams, processing streams, and processed feedstock streams, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting catalyzed carbonaceous feedstock can be stored for future use or transferred to one or more feed operations for introduction into the catalytic gasifiers. The catalyzed carbonaceous feedstock can be conveyed to storage or feed operations according to any methods known to those skilled in the art, for example, a screw conveyer or pneumatic transport.

Further, excess moisture can be removed from the catalyzed carbonaceous feedstock. For example, the catalyzed carbonaceous feedstock may be dried with a fluid bed slurry drier (i.e., treatment with superheated steam to vaporize the liquid), or the solution thermally evaporated or removed under a vacuum, or under a flow of an inert gas, to provide a catalyzed carbonaceous feedstock having a residual moisture content, for example, of about 10 wt % or less, or of about 8 wt % or less, or about 6 wt % or less, or about 5 wt % or less, or about 4 wt % or less.

Optional Supplemental Gasification Processes (a) Char and Catalyst Recovery

Reaction of the second carbonaceous feedstock in the presence of the gasification catalyst (e.g., provided as a catalyzed carbonaceous feedstock) under the described conditions generally provides the second gas stream (40) and a solid char product from the catalytic gasifier. Similarly, reaction of the first carbonaceous feedstock in the oxygen-blown gasifier under the described conditions generally provides the first gas stream (90) and a solid char (or ash) product. The solid char product typically comprises quantities of unreacted carbonaceous material and, when recovered from a catalytic gasifier, entrained catalyst. The solid char product can be removed from the reaction chamber for sampling, purging, and/or catalyst recovery via a char outlet.

The term "entrained catalyst" as used herein means chemical compounds comprising an alkali metal component. For example, "entrained catalyst" can include, but is not limited to, soluble alkali metal compounds (such as alkali carbonates, alkali hydroxides, and alkali oxides) and/or insoluble alkali compounds (such as alkali aluminosilicates). The nature of catalyst components associated with the char extracted from a catalytic gasifier and processes for their recovery are discussed below, and in detail in previously incorporated US2007/0277437A1, US2009/0165383A1, US2009/0165382A1, US2009/0169449A1 and US2009/0169448A1.

The solid char product can be periodically withdrawn from the gasification reactors through a char outlet which is a lock hopper system, although other methods are known to those skilled in the art. Methods for removing solid char product are well known to those skilled in the art. One such method taught by EP-A-0102828, for example, can be employed.

Char from the catalytic gasifier may be passed to a catalyst recovery unit operation, as described below. Such char may also be split into multiple streams, one of which may be passed to a catalyst recovery unit, and another which may be used as a methanation catalyst (as described above) and not treated for catalyst recovery.

In certain embodiments, the alkali metal in the entrained catalyst in the solid char product withdrawn from the reaction chamber of the catalytic gasifier can be recovered, and any unrecovered catalyst can be compensated by a catalyst make-up stream. The more alumina and silica that is in the feedstock, the more costly it is to obtain a higher alkali metal recovery.

In one embodiment, the solid char product from the catalytic gasifier can be quenched with a recycle gas and water to extract a portion of the entrained catalyst. The recovered catalyst can be directed to the catalyst loading processes for reuse of the alkali metal catalyst. The depleted char can, for example, be directed to any one or more of the feedstock preparation operations for reuse in preparation of the carbonaceous feedstock (e.g., a first carbonaceous feedstock, a second carbonaceous feedstock and/or a catalyzed carbonaceous feedstock), combusted to power one or more steam generators (such as disclosed in previously incorporated US2009/0165376A1 and US2009/0217585A1), or used as such in a variety of applications, for example, as an absorbent (such as disclosed in previously incorporated US2009/0217582A1).

Other particularly useful recovery and recycling processes are described in U.S. Pat. No. 4,459,138, as well as previously incorporated US2007/0277437A1, US2009/0165383A1, US2009/0165382A1, US2009/0169449A1 and US2009/0169448A1. Reference can be had to those documents for further process details.

The recycle of catalyst can be to one or a combination of catalyst loading processes. For example, all of the recycled catalyst can be supplied to one catalyst loading process, while another process utilizes only makeup catalyst. The levels of recycled versus makeup catalyst can also be controlled on an individual basis among catalyst loading processes.

(b) Gas Purification

Product purification may comprise, for example, optional trace contaminant removal, ammonia removal and recovery, and sour shift processes. The acid gas removal (supra) may be, for example, performed on the cooled second gas stream (50) passed directly from a heat exchanger, or on a cooled second gas stream that has passed through either one or more of (i) one or more of the trace contaminants removal units; (ii) one or more sour shift units; (iii) one or more ammonia recovery units and (iv) the sulfur-tolerant catalytic methanators as discussed above.

(1) Trace Contaminant Removal

As is familiar to those skilled in the art, the contamination levels of a gas stream (e.g., cooled second gas stream (50)) will depend on the nature of the carbonaceous material used for preparing the catalyzed carbonaceous feed stock. For example, certain coals, such as Illinois #6, can have high sulfur contents, leading to higher COS contamination; and other coals, such as Powder River Basin coals, can contain significant levels of mercury which can be volatilized in the gasification reactor.

COS can be removed from a gas stream (e.g., the cooled second gas stream (50)), for example, by COS hydrolysis (see, U.S. Pat. Nos. 3,966,875, 4,011,066, 4,100,256, 4,482,529 and 4,524,050), passing the gas stream through particulate limestone (see, U.S. Pat. No. 4,173,465), an acidic buffered $CuSO_4$ solution (see, U.S. Pat. No. 4,298,584), an alkanolamine absorbent such as methyldiethanolamine, triethanolamine, dipropanolamine, or diisopropanolamine, containing tetramethylene sulfone (sulfolane, see, U.S. Pat. No. 3,989,811); or counter-current washing of the gas stream with refrigerated liquid $CO_2$ (see, U.S. Pat. No. 4,270,937 and U.S. Pat. No. 4,609,388).

HCN can be removed from a gas stream (e.g., cooled second gas stream (50)), for example, by reaction with ammonium sulfide or polysulfide to generate $CO_2$, $H_2S$ and $NH_3$ (see, U.S. Pat. Nos. 4,497,784, 4,505,881 and 4,508,693), or a two stage wash with formaldehyde followed by ammonium or sodium polysulfide (see, U.S. Pat. No. 4,572,826), absorbed by water (see, U.S. Pat. No. 4,189,307), and/or decomposed by passing through alumina supported hydrolysis catalysts such as $MoO_3$, $TiO_2$ and/or $ZrO_2$ (see, U.S. Pat. Nos. 4,810,475, 5,660,807 and 5,968,465).

Elemental mercury can be removed from a gas stream (e.g., cooled second gas stream (50)), for example, by absorption by carbon activated with sulfuric acid (see, U.S. Pat. No. 3,876,393), absorption by carbon impregnated with sulfur (see, U.S. Pat. No. 4,491,609), absorption by a $H_2S$-containing amine solvent (see, U.S. Pat. No. 4,044,098), absorption by silver or gold impregnated zeolites (see, U.S. Pat. No. 4,892,567), oxidation to HgO with hydrogen peroxide and methanol (see, U.S. Pat. No. 5,670,122), oxidation with bromine or iodine containing compounds in the presence of $SO_2$ (see, U.S. Pat. No. 6,878,358), oxidation with a H, Cl and O—containing plasma (see, U.S. Pat. No. 6,969,494), and/or oxidation by a chlorine-containing oxidizing gas (e.g., ClO, see, U.S. Pat. No. 7,118,720).

When aqueous solutions are utilized for removal of any or all of COS, HCN and/or Hg, the waste water generated in the trace contaminants removal units can be directed to a waste water treatment unit.

When present, a trace contaminant removal of a particular trace contaminant should remove at least a substantial portion (or substantially all) of that trace contaminant from the so-treated gas stream (e.g., cooled second gas stream (50)), typically to levels at or lower than the specification limits of the desired product stream. Typically, a trace contaminant removal should remove at least 90%, or at least 95%, or at least 98%, of COS, HCN and/or mercury from a cooled second gas stream.

(2) Sour Shift

A gas stream (e.g., cooled second gas stream (50)) also can be subjected to a water-gas shift reaction in the presence of an aqueous medium (such as steam) to convert a portion of the CO to $CO_2$ and to increase the fraction of $H_2$. In certain examples, the generation of increased hydrogen content can be utilized to form a hydrogen product gas which can be separated from methane as discussed below. In certain other examples, a sour shift process may be used to adjust the carbon monoxide:hydrogen ratio in a gas stream (e.g., the cooled second gas stream) for providing to a subsequent methanator. The water-gas shift treatment may be performed, for example, on the cooled second gas stream passed directly from the heat exchanger or on the cooled second gas stream that has passed through a trace contaminants removal unit.

A sour shift process is described in detail, for example, in U.S. Pat. No. 7,074,373. The process involves adding water, or using water contained in the gas, and reacting the resulting water-gas mixture adiabatically over a steam reforming catalyst. Typical steam reforming catalysts include one or more Group VIII metals on a heat-resistant support.

Methods and reactors for performing the sour gas shift reaction on a CO-containing gas stream are well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina. Suitable methods for the sour shift process are described in previously incorporated U.S. patent application Ser. No. 12/415,050.

Steam shifting is often carried out with heat exchangers and steam generators to permit the efficient use of heat energy. Shift reactors employing these features are well known to those of skill in the art. An example of a suitable shift reactor is illustrated in previously incorporated U.S. Pat. No. 7,074,373, although other designs known to those of skill in the art are also effective. Following the sour gas shift procedure, the one or more cooled second gas streams each generally contains $CH_4$, $CO_2$, $H_2$, $H_2S$, $NH_3$, and steam.

In some embodiments, it will be desirable to remove a substantial portion of the CO from a cooled gas stream, and thus convert a substantial portion of the CO. "Substantial" conversion in this context means conversion of a high enough percentage of the component such that a desired end product can be generated. Typically, streams exiting the shift reactor, where a substantial portion of the CO has been converted, will have a carbon monoxide content of about 250 ppm or less CO, and more typically about 100 ppm or less CO.

In other embodiments, it will be desirable to convert only a portion of the CO so as to increase the fraction of $H_2$ for a subsequent methanation (e.g., a trim methanation), which will typically require an $H_2/CO$ molar ratio of about 3 or greater, or greater than about 3, or about 3.2 or greater.

(3) Ammonia Recovery

As is familiar to those skilled in the art, gasification of biomass and/or utilizing air as an oxygen source for the gasification reactor can produce significant quantities of ammonia in the product gas streams. Optionally, a gas stream (e.g., the second gas stream) can be scrubbed by water in one or more ammonia recovery units to recovery ammonia. The ammonia recovery treatment may be performed, for example, on the cooled second gas stream passed directly from the heat exchanger or on a gas stream (e.g., a cooled second gas stream) that has passed through either one or both of (i) one or more of the trace contaminants removal units; and (ii) one or more sour shift units.

After scrubbing, the gas stream (e.g., the cooled second gas stream) can comprise at least $H_2S$, $CO_2$, CO, $H_2$ and $CH_4$. When the gas stream has previously passed through a sour shift unit, then, after scrubbing, the gas stream can comprise at least $H_2S$, $CO_2$, $H_2$ and $CH_4$.

Ammonia can be recovered from the scrubber water according to methods known to those skilled in the art, can typically be recovered as an aqueous solution (e.g., 20 wt %). The waste scrubber water can be forwarded to a waste water treatment unit.

When present, an ammonia removal process should remove at least a substantial portion (and substantially all) of the ammonia from the scrubbed stream (e.g., the cooled second gas stream). "Substantial" removal in the context of ammonia removal means removal of a high enough percentage of the component such that a desired end product can be generated. Typically, an ammonia removal process will remove at least about 95%, or at least about 97%, of the ammonia content of a scrubbed second gas stream.

(c) Methane Removal

The third gas stream or methane-enriched third gas stream can be processed, when necessary, to separate and recover $CH_4$ by any suitable gas separation method known to those skilled in the art including, but not limited to, cryogenic distillation and the use of molecular sieves or gas separation (e.g., ceramic) membranes. For example, when a sour shift process is present, the third gas stream may contain methane and hydrogen which can be separated according to methods familiar to those skilled in the art, such as cryogenic distillation.

Other gas purification methods include via the generation of methane hydrate as disclosed in previously incorporated U.S. patent application Ser. Nos. 12/395,330, 12/415,042 and 12/415,050.

(d) Power Generation

A portion of the steam generated by the steam source may be provided to one or more power generators, such as a steam turbine, to produce electricity which may be either utilized within the plant or can be sold onto the power grid. High temperature and high pressure steam produced within the gasification process may also be provided to a steam turbine for the generation of electricity. For example, the heat energy captured at a heat exchanger in contact with the second gas stream can be utilized for the generation of steam which is provided to the steam turbine.

(e) Waste Water Treatment

Residual contaminants in waste water resulting from any one or more of the trace removal, sour shift, ammonia removal, and/or catalyst recovery processes can be removed in a waste water treatment unit to allow recycling of the recovered water within the plant and/or disposal of the water from the plant process according to any methods known to those skilled in the art. Such residual contaminants can comprise, for example, phenols, CO, $CO_2$, $H_2S$, COS, HCN, ammonia, and mercury. For example, $H_2S$ and HCN can be removed by acidification of the waste water to a pH of about 3, treating the acidic waste water with an inert gas in a stripping column, increasing the pH to about 10 and treating the waste water a second time with an inert gas to remove ammonia (see U.S. Pat. No. 5,236,557). $H_2S$ can be removed by treating the waste water with an oxidant in the presence of residual coke particles to convert the $H_2S$ to insoluble sulfates which may be removed by flotation or filtration (see U.S. Pat. No. 4,478,425). Phenols can be removed by contacting the waste water with a carbonaceous char containing mono- and divalent basic inorganic compounds (e.g., the solid char product or the depleted char after catalyst recovery, supra) and adjusting the pH (see U.S. Pat. No. 4,113,615). Phenols can also be removed by extraction with an organic solvent followed by treatment of the waste water in a stripping column (see U.S. Pat. Nos. 3,972,693, 4,025,423 and 4,162,902).

(f) Multi-Train Processes

In the processes of the invention, each process may be performed in one or more processing units. For example, one or more catalytic gasifiers may be supplied with the catalyzed carbonaceous feedstock from one or more catalyst loading and/or feedstock preparation unit operations. Similarly, the second gas streams generated by one or more catalytic gasifiers may be processed or purified separately or via their combination at a heat exchanger, sulfur-tolerant catalytic methanator, acid gas removal unit, trim methanator, and/or methane removal unit depending on the particular system configuration, as discussed, for example, in previously incorporated U.S. patent application Ser. Nos. 12/492,467, 12/492,477, 12/492,484, 12/492,489 and 12/492,497.

In certain embodiments, the processes utilize two or more catalytic gasifiers (e.g., 2-4 catalytic gasifiers). In such embodiments, the processes may contain divergent processing units (i.e., less than the total number of catalytic gasifiers) prior to the catalytic gasifiers for ultimately providing the catalyzed carbonaceous feedstock to the plurality of catalytic gasifiers and/or convergent processing units (i.e., less than the total number of catalytic gasifiers) following the catalytic gasifiers for processing the plurality of second gas streams generated by the plurality of catalytic gasifiers.

For example, the processes may utilize (i) divergent catalyst loading units to provide the catalyzed carbonaceous feedstock to the catalytic gasifiers; (ii) divergent carbonaceous materials processing units to provide a carbonaceous particulate to the catalyst loading units; (iii) convergent heat exchangers to accept a plurality of second gas streams from the catalytic gasifiers; (iv) convergent sulfur-tolerant methanators to accept a plurality of cooled second gas streams from the heat exchangers; (v) convergent acid gas removal units to accept a plurality of cooled second gas streams from the heat exchangers or methane-enriched second gas streams from the sulfur-tolerant methanators, when present; or (vi) convergent catalytic methanators or trim methanators to accept a plurality of third gas streams from acid gas removal units. As described above, in certain embodiments of the invention, a single oxygen-blown gasifier can divergently supply the first gas stream to a plurality of catalytic gasifiers.

When the systems contain convergent processing units, each of the convergent processing units can be selected to have a capacity to accept greater than a 1/n portion of the total gas stream feeding the convergent processing units, where n is the number of convergent processing units. For example, in a process utilizing 4 catalytic gasifiers and 2 heat exchangers for accepting the 4 second gas streams from the catalytic gasifiers, the heat exchanges can be selected to have a capacity to accept greater than ½ of the total gas volume (e.g., ½ to ¾) of the 4 second gas streams and be in communication with two or more of the catalytic gasifiers to allow for routine maintenance of the one or more of the heat exchangers without the need to shut down the entire processing system.

Similarly, when the systems contain divergent processing units, each of the divergent processing units can be selected to have a capacity to accept greater than a 1/m portion of the total feed stream supplying the convergent processing units, where m is the number of divergent processing units. For example, in a process utilizing 2 catalyst loading units and a single carbonaceous material processing unit for providing the carbonaceous particulate to the catalyst loading units, the catalyst loading units, each in communication with the carbonaceous material processing unit, can be selected to have a capacity to accept ½ to all of the total volume of carbonaceous particulate from the single carbonaceous material processing unit to allow for routine maintenance of one of the catalyst loading units without the need to shut down the entire processing system.

EXAMPLES

Example 1

Figure 3:
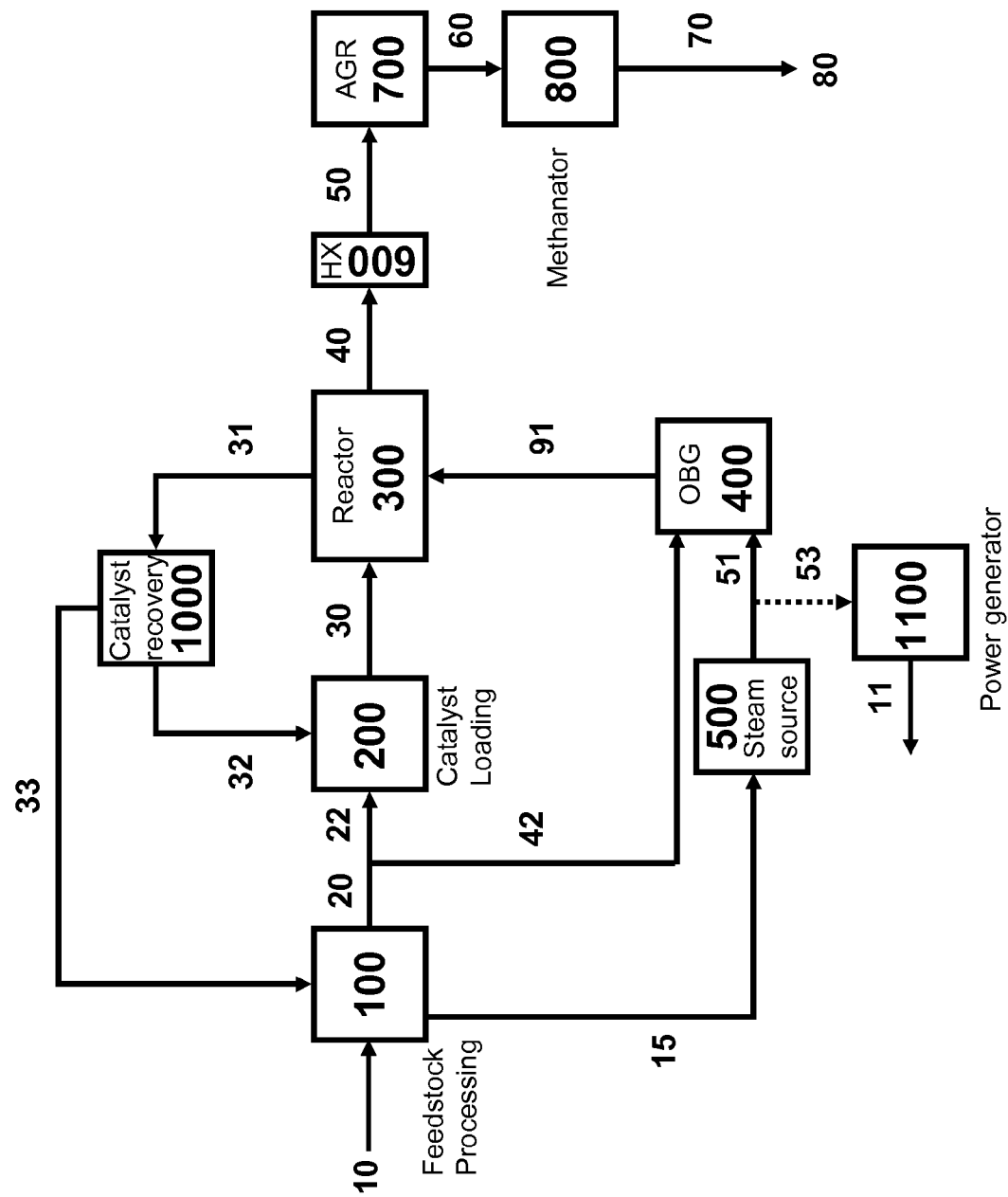
FIG. 3 is a diagram of another embodiment of a gasification process as described with respect to FIG. 1, further including processes for preparing the catalyzed feedstock and recovering and recycling catalyst from the char produced by the gasifier.

One embodiment of the processes of the invention is illustrated in FIG. 3. A carbonaceous material (10) is provided to a feedstock processing unit (100) and is converted to a carbonaceous particulate (20) having an average particle size of less than about 2500 μm. The carbonaceous particulate (20) is separated into a first carbonaceous feedstock (22) and a second carbonaceous feedstock (42). The second carbonaceous feedstock is provided to a catalyst loading unit (200) in which the particulate is contacted with a solution comprising a gasification catalyst in a loading tank, the excess water removed by filtration, and the resulting wet cake dried with a drier to provide a catalyzed carbonaceous feedstock (30). The catalyzed carbonaceous feedstock is provided to a catalytic gasification reactor (300).

In the gasification reactor, the catalyzed carbonaceous feedstock (30) is contacted with a first gas stream (91) comprising carbon monoxide, hydrogen, and superheated steam under conditions suitable to generate a hot second gas stream (40) comprising at least methane, carbon dioxide, carbon monoxide, hydrogen, and hydrogen sulfide. The gasification reactor generates a solid char product (31), comprising entrained catalyst, which is periodically removed from their respective reaction chambers and directed to the catalyst recovery operation (1000) in which the entrained catalyst (32) is recovered and returned to the catalyst loading operation (200). Depleted char (33) generated by the recovery process is directed to the feedstock processing unit (100).

The first gas stream (91) is generated by at least partially combusting the first carbonaceous feedstock (42), steam (51) and an oxygen-rich gas stream (41) in an oxygen-blown gasifier (400). The steam (51) is generated by steam source (500). Fines (15) generated in the grinding or crushing process of the feedstock processing unit (100) can be provided to the steam source for combustion. Separately, a second portion (53) of the steam generated by the steam source (500) is directed to a steam turbine (1100) to generate electricity (11).

The hot second gas stream (40) is provided to a heat exchanger unit (600) to generate a cooled second gas stream (50). The cooled second gas stream (50) is provided to an acid gas removal unit (700) in which the hydrogen sulfide and carbon dioxide in the stream are removed by sequential absorption by contacting the stream with $H_{2S}$ and $CO_2$ absorbers, and to ultimately generate a third gas stream (60) comprising carbon monoxide, hydrogen, and methane.

The third gas stream (60) is provided to a catalytic methanator in which the carbon monoxide and hydrogen in the third gas stream are converted to methane to generate a methane-enriched third gas stream (70), which can provide the methane product stream (80).

Example 2

Figure 4:
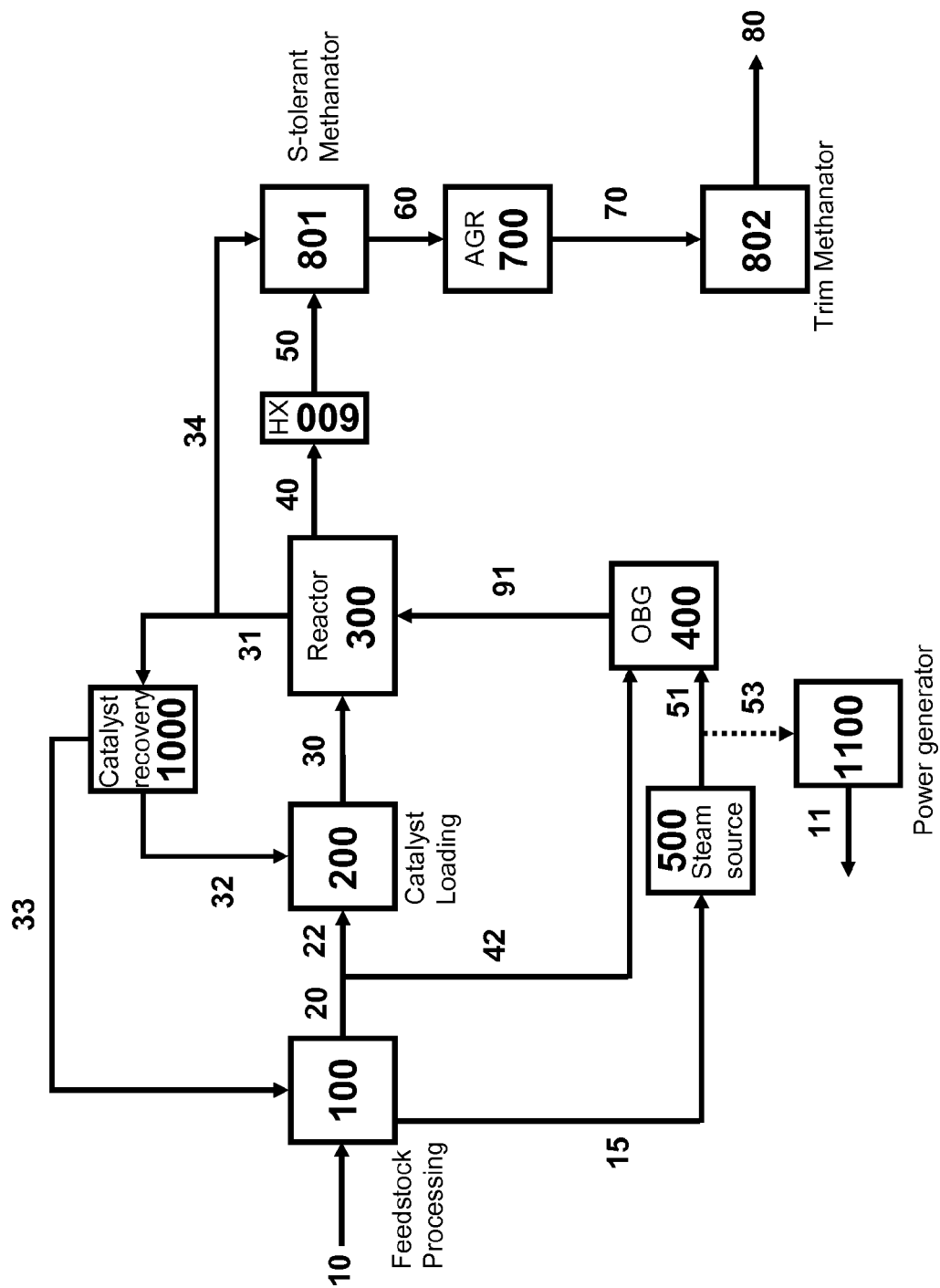
FIG. 4 is a diagram of another embodiment of a gasification process as described with respect to FIG. 2, further including processes for preparing the catalyzed feedstock, recovering and recycling catalyst from the char produced by the gasifier, utilizing a portion of the char from the gasifier as a sulfur-tolerant catalyst in the sulfur-tolerant methanator, and using a trim methanation step to provide the methane product stream.

Another embodiment of the processes of the invention is illustrated in FIG. 4. A carbonaceous material (10) is provided to a feedstock processing unit (100) and is converted to a carbonaceous particulate (20) having an average particle size of less than about 2500 μm. The carbonaceous particulate (20) is separated into a first carbonaceous feedstock (22) and a second carbonaceous feedstock (42). The second carbonaceous feedstock is provided to a catalyst loading unit (200) in which the particulate is contacted with a solution comprising a gasification catalyst in a loading tank, the excess water removed by filtration, and the resulting wet cake dried with a drier to provide a catalyzed carbonaceous feedstock (30). The catalyzed carbonaceous feedstock is provided a gasification reactor (300).

In the gasification reactor, the catalyzed carbonaceous feedstock (30) is contacted with a first gas stream (91) comprising carbon monoxide, hydrogen, and superheated steam under conditions suitable to generate a hot second gas stream (40) comprising at least methane, carbon dioxide, carbon monoxide, hydrogen, and hydrogen sulfide. The gasification reactor generates a solid char product (31), comprising entrained catalyst, which is periodically removed from the reaction chamber. Part of the solid char product (34) is separated for use in a subsequent methanation step, and the rest is directed to the catalyst recovery operation (1000) in which the entrained catalyst (32) is recovered and returned to the catalyst loading operation (200). Depleted char (33) generated by the recovery process is directed to the feedstock processing unit (100).

The first gas stream (91) is generated by at least partially combusting the first carbonaceous feedstock (42), steam (51) and an oxygen-rich gas stream (41) in an oxygen-blown gasifier (400). The steam (51) is generated by steam source (500). Fines (15) generated in the grinding or crushing process of the feedstock processing unit (100) can be provided to the steam source for combustion. Separately, a second portion (53) of the steam generated by the steam source (500) is directed to a steam turbine (1100) to generate electricity.

The second gas stream (40) is provided to a heat exchanger unit (600) to generate a cooled second gas stream (50). The cooled second gas stream (50) is provided to a sulfur-tolerant methanator (801) where the carbon monoxide and hydrogen in the cooled second gas stream (50) are reacted in the presence of a sulfur-tolerant methanation catalyst to generate a methane-enriched second gas stream (60) comprising methane, hydrogen sulfide, carbon dioxide, residual carbon monoxide and residual hydrogen. The sulfur-tolerant methanation catalyst is provided to the sulfur-tolerant methanator from a portion (34) of the char generated from the gasification reactor.

The methane-enriched second gas stream (60) is provided to an acid gas removal unit (700), in which the hydrogen sulfide and carbon dioxide in the stream are removed by sequential absorption by contacting the stream with $H_2S$ and $CO_2$ absorbers, and to ultimately generate a third gas stream (70) comprising methane, residual carbon monoxide, and residual hydrogen. The third gas stream (70) is provided to a catalytic trim methanator (802) where the residual carbon monoxide and residual hydrogen in the third gas stream are converted to methane to generate the methane product stream (80).

We claim:

1. A process for generating a plurality of gaseous products from a carbonaceous feedstock, and recovering a methane product stream, the process comprising the steps of:
    (a) supplying to an oxygen-blown gasifier (i) a first carbonaceous feedstock, (ii) an oxygen-rich gas stream and (iii) an aqueous stream comprising water and/or steam;
    (b) partially combusting the first carbonaceous feedstock with the oxygen-rich gas stream in the oxygen-blown gasifier, under suitable temperature and pressure, to generate a first gas stream comprising hydrogen, carbon monoxide and superheated steam;
    (c) introducing a second carbonaceous feedstock, a gasification catalyst and the first gas stream to a catalytic gasifier, the catalytic gasifier in communication with the oxygen-blown gasifier;
    (d) reacting the second carbonaceous feedstock and the first gas stream in the catalytic gasifier in the presence of the gasification catalyst, at a temperature of from about 450° C. to about 800° C. and a pressure of from about 400 psig to about 1000 psig, to form a second gas stream comprising a plurality of gaseous products comprising methane, carbon dioxide, hydrogen, carbon monoxide and hydrogen sulfide, wherein the second gas stream comprises at least about 50 mol % methane plus carbon dioxide, based on the moles of methane, carbon dioxide, carbon monoxide and hydrogen in the second gas stream;
    (e) optionally reacting at least a portion of the carbon monoxide and at least a portion of the hydrogen in the second gas stream in a catalytic methanator in the presence of a sulfur-tolerant methanation catalyst to produce a methane-enriched second gas stream;
    (f) removing a substantial portion of the carbon dioxide and a substantial portion of the hydrogen sulfide from the second gas stream (or the methane-enriched second gas stream if present) to produce a third gas stream comprising a substantial portion of the methane from the second gas stream (or the methane-enriched second gas stream if present);
    (g) optionally, if the third gas stream comprises hydrogen and greater than about 100 ppm carbon monoxide, reacting carbon monoxide and hydrogen present in the third gas stream in a catalytic methanator in the presence of a methanation catalyst to produce a methane-enriched third gas stream; and
    (h) recovering the third gas stream (or the methane-enriched third gas stream if present),
    wherein: (i) at least one of step (e) and step (g) is present,
        (ii) the third gas stream (or the methane-enriched third gas stream if present) is the methane product stream, or the third gas stream (or the methane-enriched third gas stream if present) is purified to generate the methane product stream, and
        (iii) carbon monoxide in the second gas stream is subjected to a water-gas shift reaction in the presence of an aqueous medium to convert a portion of the carbon monoxide to carbon dioxide and to increase the fraction of hydrogen in the second gas stream.

2. The process of claim 1, wherein steps (a), (b), (c), (d), (f) and (h), and when present (e) and (g), are continuous.

3. The process of claim 1, wherein the gasification catalyst comprises an alkali metal gasification catalyst.

4. The process of claim 1, wherein the first and second carbonaceous feedstock each independently comprise one or more of anthracite, bituminous coal, sub-bituminous coal, lignite, petroleum coke, asphaltenes, liquid petroleum residues or biomass.

5. The process of claim 1, wherein the second carbonaceous feedstock is loaded with a gasification catalyst prior to introduction into the catalytic gasifier.

6. The process of claim 5, wherein the second carbonaceous feedstock is loaded with an amount of an alkali metal gasification catalyst sufficient to provide a ratio of alkali metal atoms to carbon atoms ranging from about 0.01 to about 0.10.

7. The process of claim 1, wherein the second carbonaceous feedstock, gasification catalyst and first gas stream are introduced into a plurality of catalytic gasifiers.

8. The process of claim 7, wherein a single oxygen-blown gasifier supplies the first gas stream to the plurality of catalytic gasifiers.

9. The process of claim 1, wherein the hydrogen and carbon monoxide are present in the first gas stream in a molar ratio of about 3:1.

10. The process of clam 1, wherein the methane product stream is a pipeline-quality natural gas.

11. The process of claim 1, wherein step (e) is present.

12. The process of claim 1, wherein step (g) is present.

13. The process of claim 1, which is a once-through process.

14. The process of claim 1, wherein no carbon fuel-fired superheater is present.

15. The process of claim 1, wherein the second gas stream comprises at least about 20 mol % methane based on the moles of methane, carbon dioxide, carbon monoxide and hydrogen in the second gas stream.

* * * * *